United States Patent
Mitani et al.

(10) Patent No.: US 7,966,101 B2
(45) Date of Patent: Jun. 21, 2011

(54) METHOD AND SYSTEM FOR CONTROLLING STABILITY OF ELECTRIC POWER SYSTEM

(75) Inventors: Yasunori Mitani, Kitakyushu (JP); Masayuki Watanabe, Kitakyushu (JP)

(73) Assignee: Kyushu Institute of Technology, Fukuoka (JP)

( * ) Notice: Subject to any disclaimer, the term of this patent is extended or adjusted under 35 U.S.C. 154(b) by 972 days.

(21) Appl. No.: 11/570,109

(22) PCT Filed: Jan. 20, 2006

(86) PCT No.: PCT/JP2006/300806
§ 371 (c)(1),
(2), (4) Date: Dec. 6, 2006

(87) PCT Pub. No.: WO2006/090538
PCT Pub. Date: Aug. 31, 2006

(65) Prior Publication Data
US 2009/0240382 A1    Sep. 24, 2009

(30) Foreign Application Priority Data

Feb. 22, 2005  (JP) ................................. 2005-045176

(51) Int. Cl.
*G05D 19/00*  (2006.01)
*G06R 21/06*  (2006.01)
(52) U.S. Cl. .......... 700/287; 700/297; 700/298; 702/57; 702/60
(58) Field of Classification Search .................. 700/298, 700/291, 297, 286, 287; 702/57, 58, 60; 322/19, 20, 28; 323/205, 207
See application file for complete search history.

(56) References Cited

U.S. PATENT DOCUMENTS

| 4,967,129 A | 10/1990 | Tanaka |
| 5,300,876 A * | 4/1994 | Takagi ........................... 322/58 |

(Continued)

FOREIGN PATENT DOCUMENTS

JP    2001-352679    12/2001

(Continued)

OTHER PUBLICATIONS

Watanabe, M.; Mitani, Y.; Tsuji, K.; , "A numerical method to evaluate power system global stability determined by limit cycle," Power Systems, IEEE Transactions on , vol. 19, No. 4, pp. 1925-1934, Nov. 2004.*

*Primary Examiner* — Albert Decady
*Assistant Examiner* — Dave Robertson
(74) *Attorney, Agent, or Firm* — McGlew and Tuttle, P.C.

(57) ABSTRACT

The phase and time information of a voltage at a power supply outlet is detected at points, and sent to a data server. With one end of a system used as a phase angle reference, the data server observes phase differences at another end, and at a center. The data server then extracts an inter-system fluctuation component from an obtained fluctuation, and constructs an expanded combined vibration model for data sets obtained through first- and second-order differentiations of the component. The expanded combined vibration model is obtained by expanding a combined vibration model to include a known model of a PSS provided for a generator of interest. Time-series data regarding state variables of the PSS at the time of construction of the expanded combined vibration model are obtained, and PSS parameters are determined directly therefrom by the expanded combined vibration model, thereby achieving stabilization of dominant modes.

6 Claims, 18 Drawing Sheets

U.S. PATENT DOCUMENTS

| | | | |
|---|---|---|---|
| 5,448,167 A * | 9/1995 | Takagi | 324/177 |
| 6,130,531 A * | 10/2000 | Hao | 324/85 |
| 6,539,343 B2 * | 3/2003 | Zhao et al. | 702/190 |
| 7,069,159 B2 * | 6/2006 | Zima et al. | 702/57 |
| 7,692,336 B2 * | 4/2010 | Pilz et al. | 307/96 |
| 2008/0059088 A1 * | 3/2008 | Atanackovic et al. | 702/60 |
| 2009/0079267 A1 * | 3/2009 | Korba et al. | 307/102 |

FOREIGN PATENT DOCUMENTS

JP 2004-282882 10/2004

* cited by examiner

GENERAL SYSTEM CONFIGURATION OF THE PRESENT INVENTION

FIG. 4

DYNAMIC CHARACTERISTIC OF PSS

EXAMPLE OF DYNAMIC CHARACTERISTIC OF PSS

FIG.7

$$\begin{bmatrix} \dot{x}_1 \\ \dot{x}_2 \\ \dot{x}_3 \\ \dot{x}_4 \\ \dot{V}_{PSS1} \\ \dot{x}_{a1} \\ \dot{x}_{b1} \\ \dot{x}_{c1} \\ \dot{V}_{PSS250} \\ \dot{x}_{a250} \\ \dot{x}_{b250} \\ \dot{x}_{c250} \end{bmatrix} = \begin{bmatrix} a'_1 & a'_2 & a'_3 & a'_4 & c_1 & 0 & 0 & 0 & 0 & 0 & 0 & 0 \\ 1 & 0 & 0 & 0 & 0 & 0 & 0 & 0 & 0 & 0 & 0 & 0 \\ b'_1 & b'_2 & b'_3 & b'_4 & 0 & 0 & 0 & 0 & c_2 & 0 & 0 & 0 \\ 0 & 0 & 1 & 0 & 0 & 0 & 0 & 0 & 0 & 0 & 0 & 0 \\ 0.121 & 0 & 0 & 0 & -50 & -45.51 & -13.62 & -20600 & 0 & 0 & 0 & 0 \\ 0.00053 & 0 & 0 & 0 & 0 & -0.2 & 0 & 0 & 0 & 0 & 0 & 0 \\ 0.00053 & 0 & 0 & 0 & 0 & -0.2 & -0.662 & 0 & 0 & 0 & 0 & 0 \\ 0.00058 & 0 & 0 & 0 & 0 & -0.220 & -0.0658 & -100 & 0 & 0 & 0 & 0 \\ 0 & 0 & 0.121 & 0 & 0 & 0 & 0 & 0 & -50 & -45.51 & -13.62 & -20600 \\ 0 & 0 & 0.00053 & 0 & 0 & 0 & 0 & 0 & 0 & -0.2 & 0 & 0 \\ 0 & 0 & 0.00053 & 0 & 0 & 0 & 0 & 0 & 0 & -0.2 & -0.662 & 0 \\ 0 & 0 & 0.00058 & 0 & 0 & 0 & 0 & 0 & 0 & -0.220 & -0.066 & -100 \end{bmatrix} \begin{bmatrix} x_1 \\ x_2 \\ x_3 \\ x_4 \\ V_{PSS1} \\ x_{a1} \\ x_{b1} \\ x_{c1} \\ V_{PSS250} \\ x_{a250} \\ x_{b250} \\ x_{c250} \end{bmatrix}$$

PARAMETERS OF PSS BEFORE STABILIZATION

PARAMETERS OF PSS1 AFTER BEING DESIGNED

PARAMETERS OF PSS250 AFTER BEING DESIGNED

VERIFICATION OF EFFECT OF STABILIZATION CONTROL

FREQUENCY CHANGE AT KYUSYU INSTITUTE OF TECHNOLOGY

FREQUENCY CHANGES AT VARIOUS LOCATIONS

FLUCTUATION WAVEFORM OF FIRST MODE

FLUCTUATION WAVEFORM OF SECOMD MODE

FLUCTUATION WAVEFORM OF FIRST MODE

FLUCTUATION WAVEFORM OF SECOMD MODE

WEST 10-GENERATOR SYSTEM MODEL

MODEL OF EXCITATION SYSTEM WITH $\Delta\omega$-TYPE PSS

FIG. 23

PSS CONSTANTS AND EIGENVALUE CHANGES

| parameter | full system | approx. model |
|---|---|---|
| initial condition | $-0.065 \pm j1.731$<br>$-0.154 \pm j4.055$ | $-0.080 \pm j2.223$<br>$-0.182 \pm j3.832$ |
| $K = 0.02$ | $-0.048 \pm j1.714$<br>$-0.152 \pm j4.050$ | $-0.074 \pm j2.152$<br>$-0.179 \pm j3.815$ |
| $K = 0.4$ | $-0.080 \pm j1.751$<br>$-0.157 \pm j4.061$ | $-0.085 \pm j2.292$<br>$-0.184 \pm j3.847$ |
| $T_1 = 2.16$ | $-0.071 \pm j1.735$<br>$-0.155 \pm j4.057$ | $-0.082 \pm j2.248$<br>$-0.183 \pm j3.835$ |
| $T_1 = 1.16$ | $-0.058 \pm j1.728$<br>$-0.153 \pm j4.054$ | $-0.078 \pm j2.196$<br>$-0.181 \pm j3.828$ |
| $T_2 = 2.01$ | $-0.059 \pm j1.728$<br>$-0.154 \pm j4.054$ | $-0.078 \pm j2.201$<br>$-0.181 \pm j3.828$ |
| $T_2 = 1.01$ | $-0.076 \pm j1.736$<br>$-0.156 \pm j4.058$ | $-0.083 \pm j2.261$<br>$-0.183 \pm j3.836$ |
| $T_3 = 2.57$ | $-0.070 \pm j1.735$<br>$-0.155 \pm j4.057$ | $-0.082 \pm j2.243$<br>$-0.183 \pm j3.835$ |
| $T_3 = 1.57$ | $-0.060 \pm j1.728$<br>$-0.154 \pm j4.054$ | $-0.078 \pm j2.202$<br>$-0.181 \pm j3.828$ |
| $T_4 = 0.51$ | $-0.048 \pm j1.732$<br>$-0.150 \pm j4.052$ | $-0.075 \pm j2.154$<br>$-0.179 \pm j3.826$ |

FIG. 24

PSS CONSTANTS AFTER ADJUSTMENT

| parameter | initial | G1 | G5 |
|---|---|---|---|
| $K$ | 0.20 | 0.37 | 0.23 |
| $T_1$ | 1.66 | 1.82 | 2.64 |
| $T_2$ | 1.51 | 0.83 | 0.64 |
| $T_3$ | 2.07 | 2.31 | 2.09 |
| $T_4$ | 0.01 | | |

METHOD AND SYSTEM FOR CONTROLLING STABILITY OF ELECTRIC POWER SYSTEM

TECHNICAL FIELD

The present invention relates to a method and system for controlling, in real time, the stability of an electric power system on the basis of data collection at a plurality of points located over a wide area.

BACKGROUND ART

In the Japanese electric power industry, in April 2005, the scope of electricity retail liberalization was expanded to commercial-scale utility customers of 50 kW, and wheeling charge for electric power accommodation across a plurality of power companies will be unified. Therefore, retail wheeling to a city or plant from a remote location is expected to be actively pursued. Under these circumstances, it is important to accurately grasp the margin for sending electrical power, and to quickly cope with a possible problem by re-setting a stabilization control apparatus.

Fluctuation of an electric power system is stabilized mainly through design of an auxiliary signal of an excitation system. In a generally known method, local and wide-area fluctuations in an electric power system are stabilized by means of signal processing in which advance or delay in phase is compensated by use of a generator angular speed deviation $\Delta\omega$ and a generator output deviation $\Delta P$ obtained from the power system (see Patent Document 1).

FIG. 25 is a diagram showing the functions of an excitation apparatus and a PSS (power system stabilizer) used for system stability control. Section (A) schematically shows the configuration of a single generator connected to an electric power system, and section (B) is a block diagram showing the details of the excitation apparatus and the PSS shown in section (A). A large number of generators are connected to the power system, and in order to stabilize each generator, a PSS is provided so as to feed-back the rotational angular speed deviation $\Delta\omega$ or the like of the generator to be used as an auxiliary signal of the excitation apparatus, which controls the field winding voltage.

As shown in FIG. 25(B), the excitation apparatus (AVR) controls the generator terminal voltage $V_t$ to a prescribed value $V_{ref}$, and increases or decreases an excitation voltage $E_{fd}$ based on the deviation $(V_{ref}-V_t)$. The dynamic characteristics of the exciter and an excitation voltage generator which produces a voltage necessary to operate the exciter which produces the excitation voltage are shown in the respective blocks in the drawing. "s" represents a Laplacian operator. A hunting prevention section is provided so as to prevent abrupt changes in a signal.

The generator terminal voltage $V_t$ is input from the outer terminal of the generator via a transformer for measurement, and a voltage corresponding to a prescribed value of the generator output terminal voltage is input as the prescribed value $V_{ref}$. Further, a voltage $E_{fd0}/100$ corresponding to a prescribed value of the excitation voltage is generated and fed to the exciter together with the voltage generated by the excitation voltage generator. The reason for the division by 100 is that in this example, the amplification ratio of the exciter is 100, and therefore, the voltage $E_{fd0}$ must be adjusted by dividing it by 100 so as to match the signal level of the excitation voltage $E_{fd}$.

"1.0" of an amplification section of the excitation apparatus represents the signal amplification ratio thereof. If the required amplification ratio is 1.0, the amplification section is unnecessary. However, the amplification section is provided for possible cases where the amplification ratio must be changed.

"1.0/(1+0.2 s)" of the excitation voltage generator represents the characteristic of operation for generation of the voltage for operating the exciter. Here, the amplification ratio is set to 1.0, and the time constant is set to 0.2 sec.

"100.0/(1+2.0 s)" of the exciter represents the operation of the exciter for generation of the excitation voltage $E_{fd}$. The operation time constant is set to 2.0 sec, and the amplification ratio is set to 100.0.

"0.1 s/(1+0.5 s)" of the hunting prevention section represents the feedback characteristic for preventing occurrence of a hunting phenomenon, which would otherwise occur due to excessively high response speed of the output $E_{fd}$ of the exciter. The time constant and amplification factor are set to the values shown in the drawing.

Meanwhile, the PSS (power system stabilizer) is provided so as to generate an auxiliary signal for the exciter so as to stabilize the rotation of the generator; i.e., eliminate fluctuation in the rotation. As shown in the drawing, the PSS uses a change amount $\Delta\omega$ of the rotational speed of the generator as an input, and its output is applied to the excitation apparatus as an auxiliary signal (Vpss). The PSS is composed of a signal amplifier for increasing the voltage level of the input $\Delta\omega$ signal to the level of an operation signal of the excitation apparatus; a signal reset section for removing the DC deviation component from the signal; and signal phase compensators for adjusting the phase of the signal by advancing or delaying the phase to thereby stabilize the fluctuation (here, two signal phase compensators are used, for first and second signal phase adjustments).

The auxiliary signal, which is output from the PSS (power system stabilizer) on the basis of the input $\Delta\omega$, and is used to stabilize the fluctuation, is fed to the excitation voltage generator after being added to the signal $1.0 \times (V_{ref}-V_t)$, which corresponds to the deviation of the voltage $V_t$ from the prescribed value. Equations shown in the drawing represent the function of the PSS, which is actually realized by means of hardware such as a circuit board including semiconductors, etc. Similarly, in the case of the excitation apparatus as well, equations shown in the drawing represent the function of the apparatus, which is actually realized by means of hardware such as electromagnetic devices, a circuit board including semiconductors, etc.

"$K/(1+T_0 s)$" representing the operation of the signal amplifier of the PSS shows the response (response time constant $T_0$) and signal amplification (amplification ratio K) of a detector for detecting the rotational angular speed change $\Delta\omega$ of the generator. "$T_\omega s/(1+T_\omega s)$" of the signal reset section indicates that this section serves as a filter for canceling the offset component of the signal. "$(1+T_1 s)/(1+T_2 s)$" of the first signal phase adjustment section indicates that this section serves as a first signal phase compensator for adjusting the signal for fluctuation stabilization by advancing or delaying the phase of the signal. "$(1+T_3 s)/(1+T_4 s)$" of the second signal phase adjustment section indicates that this section plays the same role as the first signal phase adjustment section; i.e., this section serves as a second signal phase compensator which is connected in series to the first signal phase compensator so as to increase the amount of phase advance or delay.

A $\Delta P$-type PSS employed in many generators currently operated is effective for suppression of local fluctuation. Further, in order to suppress long-period power fluctuation, a $(\Delta P+\Delta\omega)$-type PSS is also employed in many generators, and the $(\Delta P+\Delta\omega)$-type PSS is reported to be effective in increasing the amount of power that can be transmitted stably (see Non-Patent Document 1). In another example, a PSS compensator is configured such that an additional signal is input as a feedback signal so as to stabilize a plurality of modes including a long-period fluctuation mode (see Patent Document 2).

In a known technique, information regarding an electric power system is acquired from several points in the power system; the frequency, attenuation rate, and amplitude of a fluctuation are calculated from the waveform by use of Prony analysis, and the stability of the system is monitored through observation of the results of the analysis (see Patent Document 3). However, in this method, it is considered that waveform analysis must be performed after a certain clear disturbance. Therefore, it is desired to constitute an electric power system fluctuation model from a fluctuation of an electric power system in an ordinary state. Moreover, in this technique, power source restriction is employed as a measure for system stabilization. However, a guideline for design of the excitation control system is desired.

The present inventors have installed phase measurement devices with a time synchronization function at universities throughout Japan and established a system for observing the dynamic characteristic of the entire power system. On the basis of phase information obtained through the observation, a long-period fluctuation mode; in particular, one fluctuating throughout the entire system, can be extracted from a very small fluctuation in a steady state (see Non-Patent Document 2). Thus, adjusting the PSS in accordance with the extracted fluctuation is expected to effectively suppress an inter-system long-period fluctuation. Heretofore, there has been studied a method for adjusting a PSS on the basis of a combined vibration model configured from fluctuation observation in consideration of mutual action between modes (see Non-Patent Document 3). In this method, attempts have been made to investigate the direction of change of each mode by changing PSS parameters by very small amounts and adjust the PSS on the basis of the results of the investigation. In this method, each time that adjustment is performed, the model must be reconstituted and the parameters must be determined through trial and error.

Patent Document 1: Japanese Patent Application Laid-Open (kokai) No. H10-52096
Patent Document 2: Japanese Patent Application Laid-Open (kokai) No. H11-206195
Patent Document 3: Japanese Patent Application Laid-Open (kokai) No. 2001-352679
Non-Patent Document 1: "Development of Plural PSSs Suppressing Long-Period Fluctuation of Linked System and Study on Fluctuation Model," The transactions of the Institute of Electrical Engineers of Japan B. Vol. 115-B, No. 1, 1995
Non-Patent Document 2: Hashiguchi, et al.: "Identification of Characteristic Coefficients of Power Fluctuation Based on Multipoint Synchronized Phasor Amount Measurement," Annual Conf. of Power and Energy Society of the Institute of Electrical Engineers of Japan, No. 204 (2004)
Non-Patent Document 3: Watanabe, et al.: "Power System Stabilization Control Based on Fluctuation Observation," Paper of Workshop of the Institute of Electrical Engineers of Japan, PE-04-45, PSE-04-45 (2004)
Non-Patent Document 4: "Standard Model of Power System" edited by Expert Committee for Investigation for Power System Model Standardization, Technical Report No. 754 (1999) of the Institute of Electrical Engineers of Japan
Non-Patent Document 5: Moriyuki Mizumachi, "Short Article GPS (global positioning system) Technology and its Future Development," Measurement and Control, 36, 8, pp. 533-562 (1997-8)
Non-Patent Document 6: Michito Imae, "Global Positioning System (GPS) and its Application," The transactions of the Institute of Electrical Engineers of Japan B, Vol. 118, 3, pp. 227-230 (1998-3)
Non-Patent Document 7: R. Tsukui, P. Beaumont, T. Tanaka and K. Sekiguchi: "Intranet-Based Protection and Control," IEEE Computer Applications in Power, pp. 14-17 (2001-4)
Non-Patent Document 8: The Math Workds: MATLAB Wavelet Toolbox, Wavelet Toolbox User's guide
Non-Patent Document 9: Kazuyuki Kobayashi: MATLAB Handbook, Shuwa System (1998)
Non-Patent Document 10: Haruji Ohsawa and Hiroaki Sugihara: "Consideration on Stabilization Control of Power System Composed of a Large Number of Distributed Power Sources," Paper of Workshop for Power Technology and Power System Technology of the Institute of Electrical Engineers of Japan, PE-98-116, PSE-98-106 (1998)

DISCLOSURE OF THE INVENTION

Problems to be Solved by the Invention

In view of the foregoing, an object of the present invention is to realize real-time system stability control based on wide-area data collection performed through measurement of remote and multi-point information quantities at the same time point. In order to achieve the above object, a conventional combined vibration model is expanded so as to constitute a model which includes influences of PSSs, to thereby facilitate parameter adjustment.

In Japan, as a result of a great expansion in the range of free electric power trade as of April, 2005, electric power trades via a plurality of power companies are expected to become active, and therefore, the condition of the power system may change greatly from the past. Under such circumstances, means for grasping system stability and performing proper control is desired. The present invention constitutes an electric power system fluctuation model from a fluctuation of the power system in an ordinary state.

Another object of the present invention is to make the system configuration very simple by employing, as an observation method, a method of obtaining customer voltages at a large number of points in a time-synchronized manner by use of a GPS. Through time synchronization by use of a GPS and multi-point voltage phase measurement, the dynamic characteristics of the power system can be identified.

Still another object of the present invention is to enable setting of phase measurement points within a small area in order to enable monitoring of local system stability and design of fluctuation stabilization control in such an area, to thereby permit a company having an in-house power generation network to establish a low-cost system for system monitoring and stabilization control.

Means for Solving the Problems

In the present invention, an electric power system fluctuation model which includes a model of an auxiliary signal generated by a PSS (power system stabilizer) of a generator excitation system is constructed by making use of measurement data of voltage phase measurement apparatuses having a GPS time synchronization function and disposed in a wide area, whereby the stability allowance of a dominant power fluctuation in the power system is grasped, and the power fluctuation is stabilized.

A system stability control method of the present invention controls the stability of an electric power system in real time on the basis of data collected at a plurality of points over a wide area. At each of the plurality of points in the wide area, the phase of voltage at a power supply outlet used by a consumer is detected. Data including the phase information and time information are sent to a data server via a network. With one end of the system used as a phase angle reference, the data server observes phase differences at the other end and at the center of the system. The data server then extracts an inter-system fluctuation component from the obtained fluctuation, and constructs an expanded combined vibration model for data sets obtained through first-order and second-order differentiations of the component. The expanded combined vibration model is obtained by expanding a combined vibration model which represents a first mode in which fluctuations of opposite phases occur at the opposite ends of the system and a second mode in which fluctuations occur at the opposite ends of the system in phase opposite that of a fluctuation occurring at the center of the system by use of the obtained phase difference information. The expansion is performed to include a known model of a PSS provided for a generator of interest. Time-series data regarding the state variables of the PSS at the time of construction of the expanded combined vibration model are obtained, and PSS parameters are determined directly therefrom by use of the expanded combined vibration model, whereby stabilization of the dominant modes is achieved.

A system stability control system of the present invention includes a phase measurement apparatus disposed at each of a plurality of points in a wide area and adapted to detect the phase of voltage at a power supply outlet used by a consumer and transmit data including the phase information and time information; and a data server which continuously obtains and collects the data from the plurality of points via a network. The data server includes means for observing, with one end of the system used as a phase angle reference, phase differences at the other end and at the center of the system, extracting an inter-system fluctuation component from the obtained fluctuation, and constructing an expanded combined vibration model for data sets obtained through first-order and second-order differentiations of the component. The expanded combined vibration model is obtained by expanding a combined vibration model which represents a first mode in which fluctuations of opposite phases occur at the opposite ends of the system and a second mode in which fluctuations occur at the opposite ends of the system in phase opposite that of a fluctuation occurring at the center of the system by use of the obtained phase difference information. The expansion is performed to include a known model of a PSS provided for a generator of interest. Time-series data regarding the state variables of the PSS at the time of construction of the expanded combined vibration model are obtained, and PSS parameters are determined directly therefrom by use of the expanded combined vibration model, whereby stabilization of the dominant modes is achieved.

EFFECTS OF THE INVENTION

According to the invention, an electric power system fluctuation model can be constructed from a fluctuation of the power system in an ordinary state. Further, since a functional block which supplies an auxiliary signal to the excitation system is incorporated in the power system fluctuation model, the model can be used for design of an electric power system stabilization signal using the excitation system. Since the observation can be performed through collection of consumer voltages at a large number of points time-synchronized by use of the GPS, the system configuration is expected to become very simple.

According to the invention, voltage phase measurement is performed at a large number of points, while time synchronization is effected by use of the GPS, whereby the dynamic characteristic of the power system can be identified. The combined vibration model used for this identification is expanded so as to incorporate a model of a PSS to be designed, to thereby construct an electric power system fluctuation model including the dynamic characteristic of the PSS, whereby the coefficients of the model can be identified through multi-point phase measurement. By virtue of this configuration, the stability of a fluctuation mode of interest can be evaluated. In addition, when the stability of the fluctuation is low, through designing the PSS by use of the combined vibration model, a control system which directly stabilizes that mode can be designed. Thus, it becomes possible to construct an electric power system fluctuation model through multi-point phase measurement, incorporate a PSS model thereinto, and perform designing for system stabilization by use of this model. Further, the effect attained through re-designing of the PSS can be confirmed through identification of the fluctuation characteristic.

By means of setting phase measurement points in a small area, monitoring of local system stability and design of fluctuation stabilization control in such an area become possible. Therefore, a company having an in-house power generation network can establish a low-cost system-monitoring and stabilization system.

BRIEF DESCRIPTION OF THE DRAWINGS

FIG. 4 shows state variables and a state equation which represent the expanded combined vibration model.

FIG. 7 shows example numerical values of the state equation.

FIG. 23 is a table showing changes in eigenvalues for the case where the parameters of the PSS installed for the generator 1 were changed.

FIG. 24 shows the results of adjustment of the PSS performed on the basis of the model.

BEST MODE FOR CARRYING OUT THE INVENTION

Figure 1:
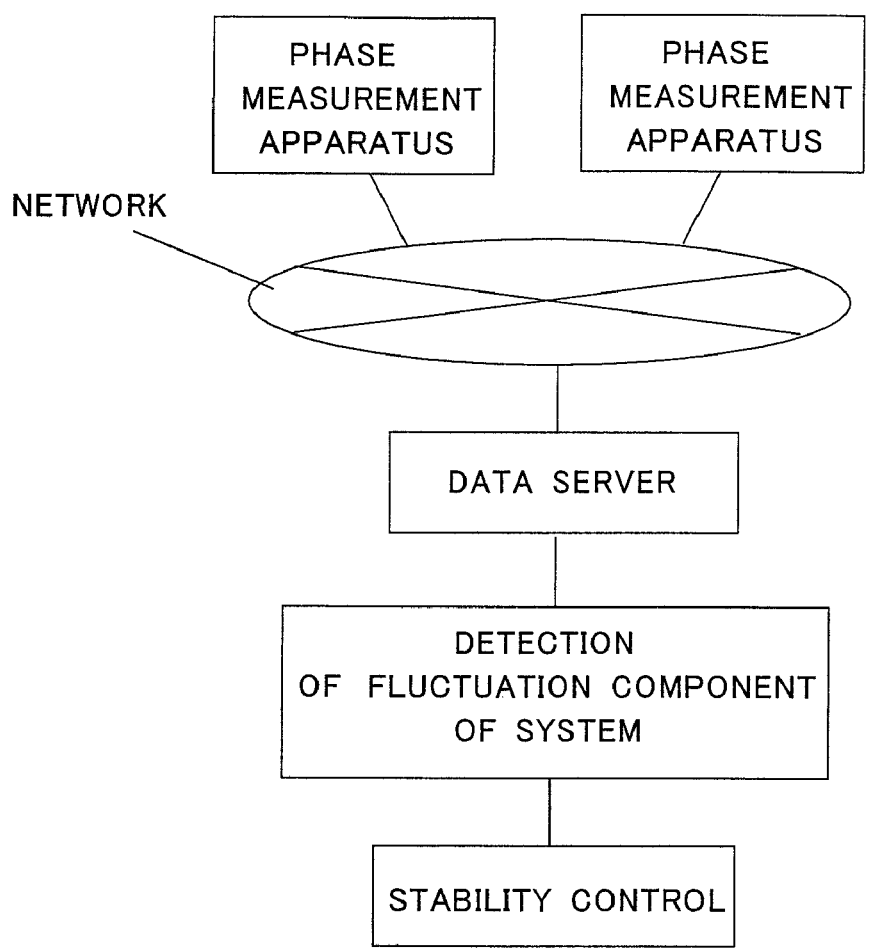
FIG. 1 is a diagram showing a general system configuration embodying the present invention.

The present invention will now be described by means of embodiments. FIG. 1 is a diagram generally showing an example system configuration embodying the present invention. A phase measurement apparatus detects phases (frequencies) at the same time point at a plurality of locations within a wide area. In order to realize real time monitoring/control on the basis of wide area data collection, phases and frequencies must be simultaneously measured at a large number of remote points. For such a purpose, a phase measurement apparatus (e.g., NCT2000 Type-A (product of Toshiba Corporation): Non-Patent Documents 7) which has a time synchronization function realized by use of, for example, a GPS (Global Positioning System) (Non-Patent Documents 5 and 6) is installed at each point. Voltages at commercial power outlets (100 V) used by ordinary customers are measured. This enables measurement of the system condition without any special large-scale construction.

Voltage phasor computation is performed in accordance with Eq. (1) by use of 96 sample data Vk (k=1, 2, ..., 96) per voltage sinusoidal wave period.

[Formula 1]

$$\dot{V} = \frac{\sqrt{2}}{96} \left\{ \sum_{k=1}^{96} V_k \sin k\theta + j \sum_{k=1}^{96} V_k \cos k\theta \right\} \quad (1)$$

Phase can be calculated in accordance with Eq. (2) from the result of Eq. (1).

[Formula 2]

$$\theta_v = \tan^{-1}\left\{\frac{F\{\dot{V}\}}{R\{\dot{V}\}}\right\} \quad (2)$$

Further, phase data can be converted to frequency data through differentiation.

Data of phases and frequencies measured simultaneously at various locations are continuously collected by a data server via a network such as the Internet. The number of measurement samplings must be determined to satisfy the requirements, such as acquiring data continuously to a possible degree, which enables observation of power fluctuation of about 1 to 2 Hz which can be observed within the system and observation of frequency change on the order of "minute." For example, data are sampled at intervals of 2/60 seconds, whereby phase data at various locations can be acquired continuously.

Next, a fluctuation component of the system is detected on the basis of the obtained data. The fluctuation component of the system can be extracted by performing wavelet transform on the fluctuation data. For example, in a fluctuation waveform at the time of generation of a system disturbance in a 60 Hz system (western Japan), a first mode (long-period fluctuation) which has the longest period among modes generated in a longitudinal power system, and a second mode which has the second longest period are detected.

A fluctuation in the range of 0.5 to 0.8 Hz is higher in frequency than the long-period fluctuation which is the lowest in frequency in the longitudinal power system, and fluctuations occur at the opposite ends of the system in the same direction in relation to the center thereof. Therefore, the fluctuation in the range of 0.5 to 0.8 Hz is considered to be a second mode in which fluctuations occur at the opposite ends of the system in a phase opposite that of a fluctuation occurring at the center of the system (Non-Patent Document 10).

As described above, in an electric power system having a longitudinal configuration, a mode to which the generators at the opposite ends of the system relate and a mode to which the generators at the opposite ends and the center of the system relate are dominant. In view of this, with one end of the system used as a phase angle reference, phase differences at the other end and the center of the system are observed. The thus-obtained fluctuation is subjected to discrete wavelet transform to thereby extract an inter-system fluctuation component. Further, for data sets obtained through first-order and second-order differentiation of the component, an expanded combined vibration model, which will be described in detail later, is constructed. This expanded combined vibration model is obtained by expanding a conventional combined vibration model so as to include the effect of a PSS which is provided for a generator of interest and whose model is known. Time-series data regarding the state variables of the PSS at the time when the expanded combined vibration model is constructed are obtained, and PSS parameters are determined directly therefrom by use of the expanded combined vibration model, whereby stabilization of the dominant modes is achieved. With this, the entire power system can be stabilized.

Figure 2:
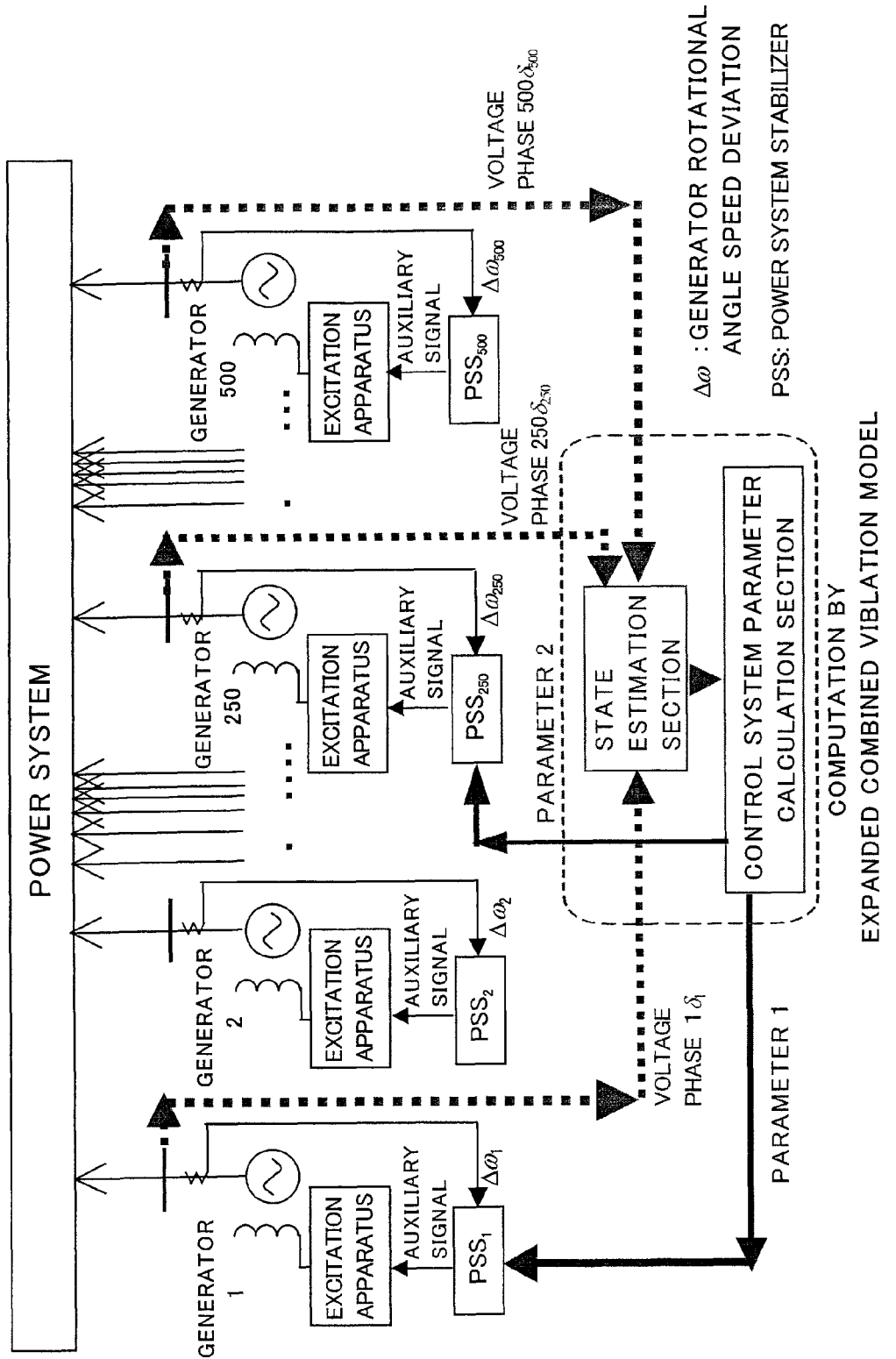
FIG. 2 is a diagram for describing the stabilization of an entire power system, taking an electric power system to which 500 generators are connected, as an example.

The stabilization of the entire power system described above will be described further while an electric power system to which 500 generators are connected as shown in FIG. 2 is taken as an example. In FIG. 2, an excitation apparatus and a PSS are provided for each of 500 generators, ranging from generator 1 shown on the left side in FIG. 2 to generator 500 shown on the right side in FIG. 2. As has been described with reference to FIG. 25, a rotational angular speed deviation Δω or the like of the generator is fed back to the PSS so as to generate an auxiliary signal of the excitation apparatus, which controls the field winding voltage, whereby the individual generator is stabilized. Further, while using one end (generator 500) of the system as a phase angle reference, a state estimation section in FIG. 2 obtains phase differences at the other end (generator 1) and the center (generator 250) of the system. On the basis of the phase difference information, a control system parameter calculation section adjusts the respective parameters (parameters 1 and 2) of the PSSs at the other end (generator 1) and the center (generator 250), whereby a desired fluctuation mode is stabilized.

For designing these parameters, the extended combined vibration model to be described later is constructed, and coefficients of the model are determined from the synchronized phase signals observed from the system. In the illustrated example, the PSS uses the angular speed $\Delta\omega$ of the corresponding generator as a feedback signal. However, even in a case where a fluctuation component $\Delta P$ of the generator output power is used as a feedback signal, the present invention can be easily practiced by use of an equation representing the relation between $\Delta P$ and $\Delta\omega$.

As shown in FIG. 2, voltage phase signals ($\delta$) measured at three locations in the entire system (e.g., at the opposite ends and the center of the system) while accurately synchronized in time by means of the GPS are transmitted to one location by means of information communication means, such as the Internet, and collected there. In this example, since the system includes 500 generators, the voltage phase 1 at the leftmost end in FIG. 2 is represented as $\delta 1$, the voltage phase 250 at the center is represented as $\delta 250$, and the voltage phase 500 at the rightmost end is represented as $\delta 500$.

After the voltage phases $\delta 1$, $\delta 250$, and $\delta 500$ are fed to the state estimation section, the parameters 1 and 2 for stabilizing the power system are calculated and output in real time through computation performed in a computer (in the control system parameter calculation section). Signals indicating these parameters are sent and input to the PSSs of the generators at two locations of the power system (e.g., one end and the center of the system), via the information communication means such as the Internet, so as to adjust the parameters of the PSSs to thereby stabilize the fluctuation component, whereby the entire power system is stabilized.

Since a time delay is produced during transmission of data over the information network, when the data are used as they are, a problem arises in computation of differences among the voltage phase angles at the three locations. In order to make the times of the obtained data coincident with one another, at the locations where the voltage phase ($\delta$) is measured, accurate time signals from the GPS (Global Positioning System) satellites are received for time synchronization. The time signals have an accuracy on the order of $\mu$ second.

Figure 25A:
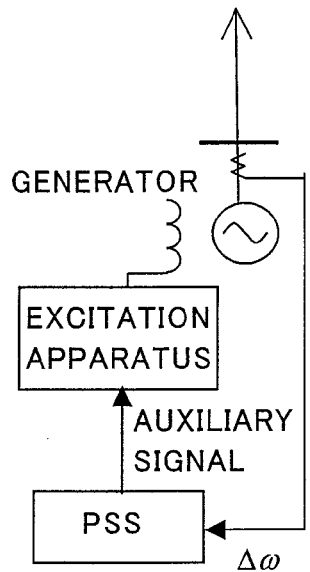
FIG. 25 is a diagram for describing the roles of an excitation apparatus and a PSS used when system stability control is performed.
Figure 25B:
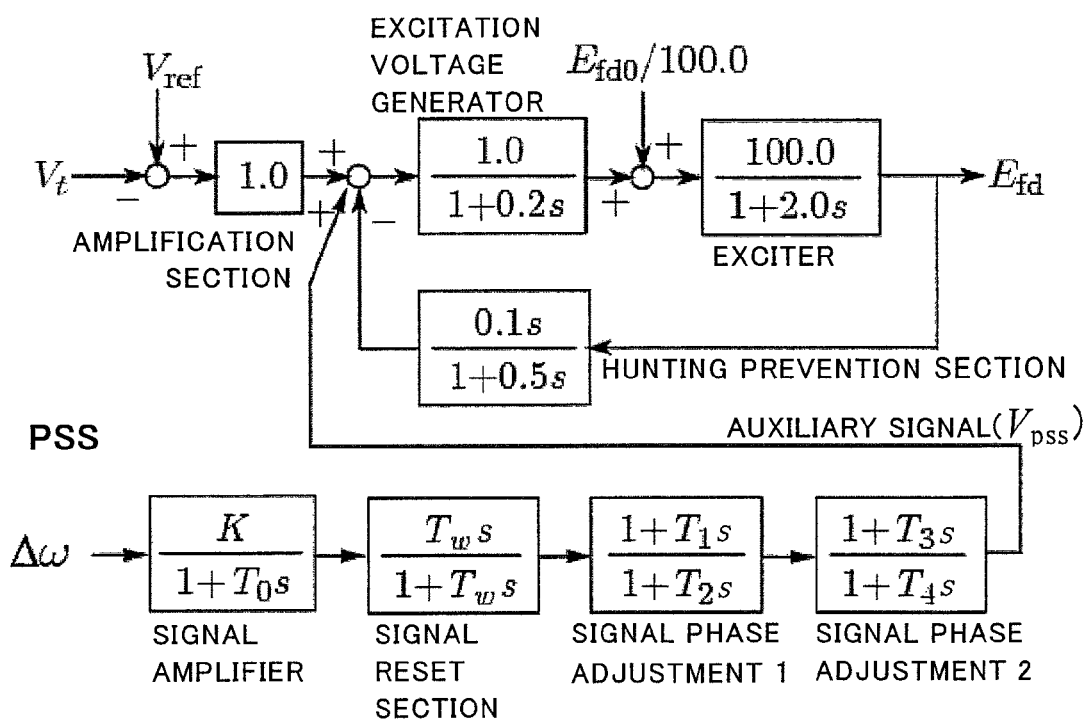

The computer is the only hardware of the portion which collects the voltage phase signals at one location (the state estimation section) and performs computation (the control system parameter calculation section). Signals inputted to the computer are merely the voltage phase ($\delta$) signals from the three locations, and the two types of parameters are the only outputs. The two types of parameters output are input to the PSS1 and PSS250 of the generator 1 and the generator 250 in real time, whereby K, $T_1$, $T_2$, $T_3$, and $T_4$ of each of the PSS1 and PSS250, which correspond to the parameters of the PSS described with reference to FIG. 25, are changed in real time. Here, K represents a signal amplification ratio, and $T_1$ to $T_4$ represent time constants of the phase compensators.

Figure 3:
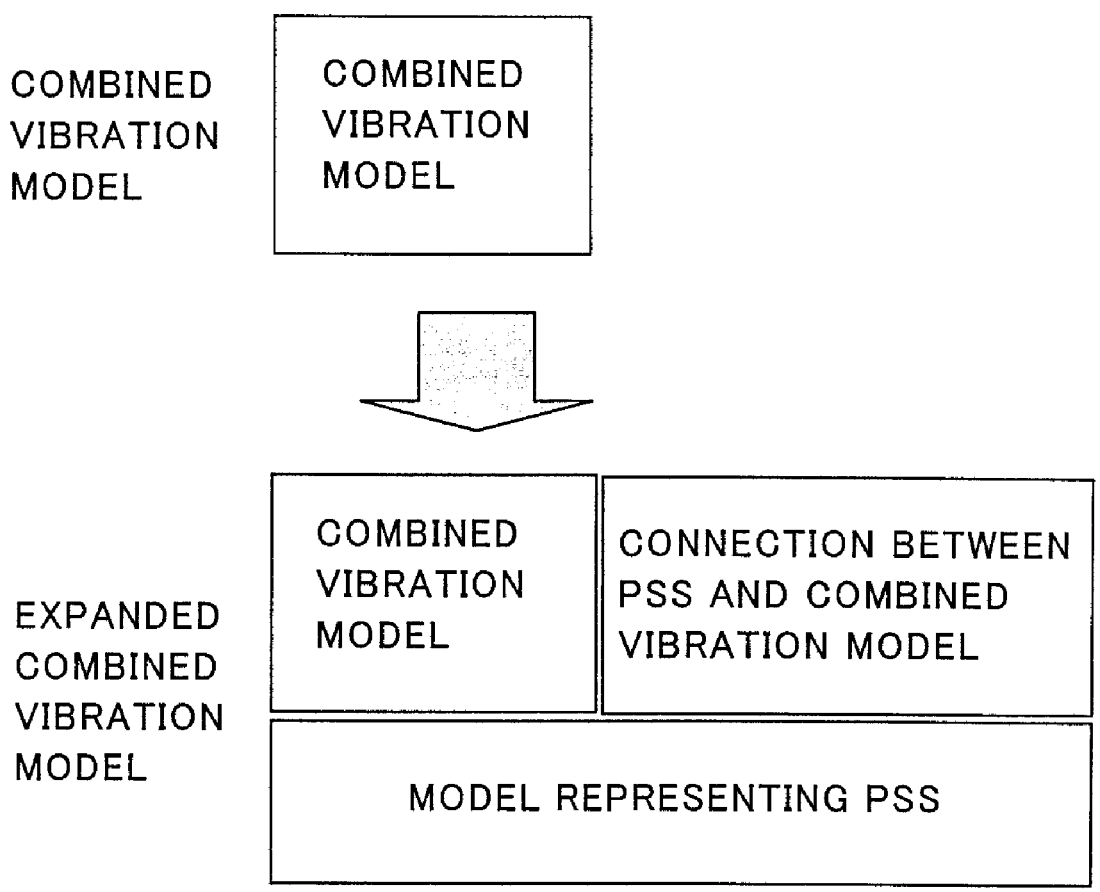
FIG. 3 is a diagram conceptually showing the difference between a combined vibration model and an expanded combined vibration model.

Next, a combined vibration model and an expanded combined vibration model constructed according to the present invention will be described. FIG. 3 is a diagram conceptually showing the difference between the combined vibration model and the expanded combined vibration model. A conventionally known combined vibration model can represent the characteristics of the first mode (a mode in which fluctuations of opposite phases occur at the opposite ends of the system) and the second mode (a mode in which fluctuations occur at the opposite ends of the system in a phase opposite that of a fluctuation occurring at the center of the system) within the power system by making use of the voltage phase signals obtained from the power system. Such a conventionally known combined vibration model can be represented by the following equation. In the equation, x1 to x4 with dots represents differential values of x1 to x4, respectively.

$$\begin{bmatrix} \dot{x}_1 \\ \dot{x}_2 \\ \dot{x}_3 \\ \dot{x}_4 \end{bmatrix} = \begin{bmatrix} a_1 & a_2 & a_3 & a_4 \\ 1 & 0 & 0 & 0 \\ b_1 & b_2 & b_3 & b_4 \\ 0 & 0 & 1 & 0 \end{bmatrix} \begin{bmatrix} x_1 \\ x_2 \\ x_3 \\ x_4 \end{bmatrix} \quad \text{[Formula 3]}$$

where $$x_1 = \dot{\delta}_1 - \dot{\delta}_s$$

$$x_2 = \delta_1 - \delta_s - (\delta_{1e} - \delta_{se})$$

$$x_3 = \dot{\delta}_2 - \dot{\delta}_s$$

$$x_4 = \delta_2 - \delta_s - (\delta_{2e} - \delta_{se}) \quad \text{[Formula 4]}$$

$\delta$ with subscript 1 or 2 represents the phase at the corresponding point of interest, $\delta$ with subscript s represents the phase at the reference point, and $\delta$ with subscript e represents the initial value of the phase. The attenuations and frequencies of the two dominant modes can be obtained by determining the eigenvalues of the coefficient matrix.

When such a combined vibration model is used, the effect of stabilization by means of the PSSs appears as changes in the values of the coefficients of the model. However, a manner of adjusting the PSSs for stabilizing the system is unknown.

In contrast, the extended combined vibration model is configured by adding to the combined vibration model a model representing the dynamic characteristics of the existing PSSs and a model representing the coupling therebetween. Since the relation between the first and second modes to be stabilized and the PSSs is represented by a model of a minimum unit, the parameters of the PSSs for stabilizing these modes can be designed by use of this extended combined vibration model. In addition, stabilization is realized by setting the determined parameter values at the PSSs of the actual system.

Next, the extended combined vibration model, which is the characteristic feature of the present invention, will be described. $\delta$ with subscript 1 or 2 represents the phase at the corresponding point of interest, $\delta$ with subscript s represents the phase at the reference point, and $\delta$ with subscript e represents the initial value of the phase. By use of these phases, x1 to x4 are defined as follows.

$$x_1 = \dot{\delta}_1 - \dot{\delta}_s$$

$$x_2 = \delta_1 - \delta_s - (\delta_{1e} - \delta_{se})$$

$$x_3 = \dot{\delta}_2 - \dot{\delta}_s$$

$$x_4 = \delta_2 - \delta_s - (\delta_{2e} - \delta_{se}) \quad \text{[Formula 5]}$$

In this case, the extended combined vibration model can be represented by the following equation.

$$\begin{bmatrix} \dot{x}_1 \\ \dot{x}_2 \\ \dot{x}_3 \\ \dot{x}_4 \\ \dot{x}_{PSS1} \\ \dot{x}_{PSS2} \end{bmatrix} = \begin{bmatrix} a'_1 & a'_2 & a'_3 & a'_4 & c_1^T \\ 1 & 0 & 0 & 0 & 0 \\ b'_1 & b'_2 & b'_3 & b'_4 & c_2^T \\ 0 & 0 & 1 & 0 & 0 \\ & & D_1 & & \\ & & D_2 & & \end{bmatrix} \begin{bmatrix} x_1 \\ x_2 \\ x_3 \\ x_4 \\ x_{PSS1} \\ x_{PSS2} \end{bmatrix} \quad \text{[Formula 6]}$$

In the above-described equation, $x_{PSS1}$ and $x_{PSS2}$ are vectors composed of state variables of the respective PSS's. c1 and c2 are coefficient vectors, which are determined along with $a'_i$ and $b'_i$ by means of a least-squares method, and in which only one component in relation to the output of the corresponding PSS is non-zero, and the remaining components are all zero. The matrices $D_1$ and $D_2$ are each determined by the structure of the corresponding PSS and include parameters such as the gain and time constant of the PSS. Notably, the PSSs are assumed to be of a Δω type for suppressing inter-system fluctuations, and x1 and x3 are used as inputs of the PSSs in the model.

The time series data regarding the state variables of the PSSs at the time of the model constitution can be obtained as inputs, whereby the matrix of the above-described equation is determined. Since all the numerical values of the extended combined model are calculated by the above processing, a portion corresponding to $D_1$ and $D_2$, which contain the parameters of the PSSs, are designed. That is, the PSS parameters contained in $D_1$ and $D_2$ are adjusted through calculation such that, among the eigenvalues of the matrix, two sets of complex eigenvalues corresponding to the first and second modes become sufficiently stable (are located at locations sufficiently separated from the imaginary axis on the left half of the complex plane). Subsequently, the adjusted PSS parameter values are sent to the corresponding generators so as to set the parameter values of the corresponding PSSs to the adjusted parameter values. Thus, stabilization is completed.

As described above, the dominant modes can be stabilized by directly adjusting and determining the PSS parameters by use of the expanded combined vibration model.

EXAMPLE 1

Figure 4:
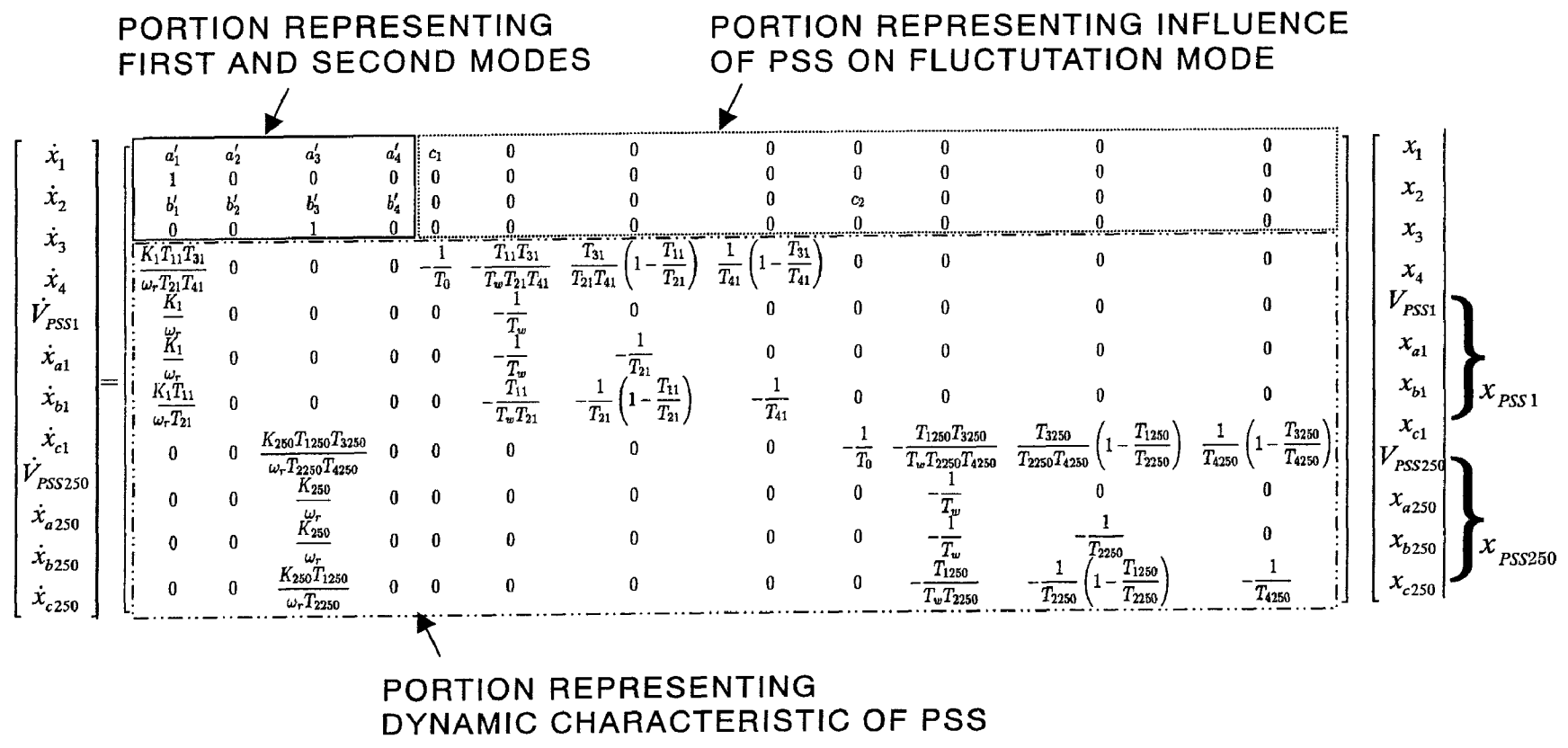

Specifically, the expanded combined vibration model is represented by the state variables and state equation as shown in FIG. 4. Notably, the state variables refer to quantities, such as "position" and "velocity," which determine the motional state of an object, and the motion of the object can be represented by a state equation representing the relation among the state variables. In the present invention, the state of a fluctuation component, which affects the wide area stability of the power system, is represented by this state equation. In this case, the phase angles measured at the opposite end of the system and in the vicinity of a reference generator correspond to the above-described "position," and their differential values correspond to the above-described "velocity." Thus, the fluctuation component of the power system can be represented as a motion of a vibration system, similar to vibration of a spring with a weight attached thereto.

The expanded combined vibration model shown in FIG. 4 is composed of a "portion representing the first and second modes," the numerical values of which are calculated through state estimation performed by use of voltage phases; a "portion representing the degree of influence of the PSSs on the fluctuation modes," the numerical values of which are calculated through state estimation performed by use of voltage phases; and a "portion representing the dynamic characteristics of the PSSs," the numerical values of which are determined when the dynamic characteristics of the PSSs of interest are found.

The details of the state variables are shown below, and each of the variables has a physical meaning. The phase differences and phase angle frequencies (x1 to x4) obtained through observation of voltage phases are state variables represented by the following equations.

$x2 = \delta1 - \delta500 - (\delta1e - \delta500e)$ $x4 = \delta250 - \delta500 - (\delta250e - \delta500e)$ $x1 = $ (differential value of x2)

$x3 = $ (differential value of x4)

Figure 5:
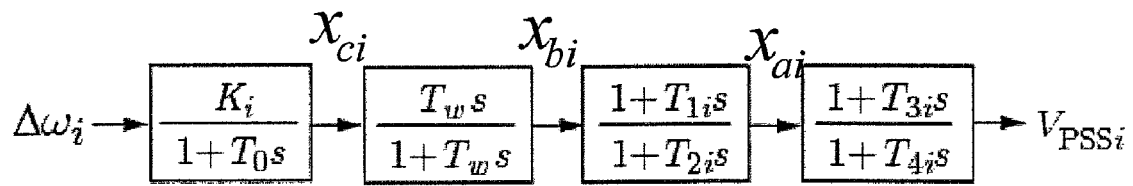
FIG. 5 is a block diagram showing an example PSS.

The subscript e represents the initial value of the corresponding variable, and the direct-current deviation is removed by subtracting the initial value. Each of $x_{PSS1}$ and $x_{PSS250}$ is a vector (4×1) which relates to a PSS having a dynamic characteristic as shown in FIG. 5 and in which signals output from the respective blocks are used as state variables. That is, xci represents a signal obtained by passing a signal Δωi through a block ki/(1+Tos). Since the block ki/(1+Tos) is a filter for cutting the high-frequency components of the signal Δωi, xci represents a signal obtained by removing the high-frequency components from the signal Δωi.

xbi represents a signal obtained by passing the signal xci through a block Tws/(1+Tws). Since the block Tws/(1+Tws) is a filter for cutting the DC component, xbi represents a signal obtained by removing the DC component from the signal xci.

xai represents a signal obtained by passing the signal xbi through a block (1+T1is)/(1+T2is). Since the block (1+T1is)/(1+T2is) is a filter for advancing or delaying the phase of the signal xbi (depending on the values of T1i and T2i), xai represents a signal obtained from the signal xbi by changing the phase thereof.

Finally, Vpssi represents a PSS signal which is supplied to the generator excitation system as an auxiliary signal. As in the above-described case, this signal Vpssi can be obtained by passing the signal xai through a phase-advancing (or delaying) filter (1+T3is)/(1+T4is).

Figure 6:
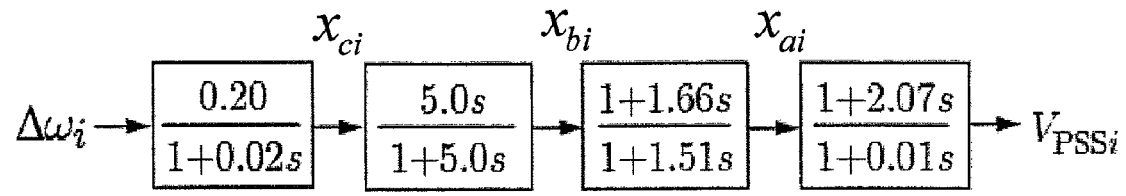
FIG. 6 is a block diagram showing the dynamic characteristic of the PSS.

Here, it is assumed that an example of the dynamic characteristic of the PSS shown in FIG. 5 is represented by the numerical values as shown in FIG. 6. In this case, the numerical value matrix of the state equation is represented as shown in FIG. 7. All the values (a1', . . . a4', b1', . . . b4', c1, c2) of the coefficient matrix of the expanded combined vibration model can be calculated from this state equation by making use of the time-series data of voltage phases at three locations within the system and through state estimation performed by use of a least-squares method.

Since all the numerical values of the expanded combined vibration model are calculated through the above-described processing, a portion corresponding to the matrices $D_1$ and $D_2$ (see Formula 6), which include PSS parameters, is designed. That is, the PSS parameters contained in $D_1$ and $D_2$ are adjusted through calculation such that, among the eigenvalues of the matrix, two sets of complex eigenvalues corresponding to the first and second modes become sufficiently stable (are located at locations sufficiently separated from the imaginary axis on the left half of the complex plane). Subsequently, the eigenvalues are calculated from the adjusted PSS parameter values while using a numerical value calculation model which is configured in consideration of the dynamic characteristic of the entire system, so as to check whether or not a problem exists. When no problem exists, the adjusted PSS parameter values are sent to the corresponding generators so as to set the parameter values of the corresponding PSSs to the adjusted parameter values. Thus, stabilization is completed.

EXAMPLE 2

Figure 8:
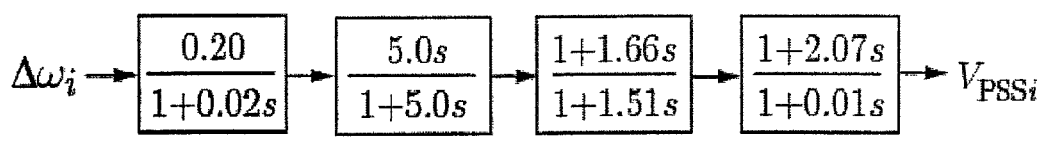
FIG. 8 is a block diagram showing the parameters of the PSS before stabilization.
Figure 9:
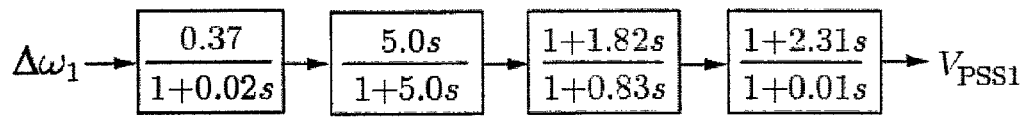
FIG. 9 is a block diagram showing the parameters of a PSS1 after being designed.
Figure 10:
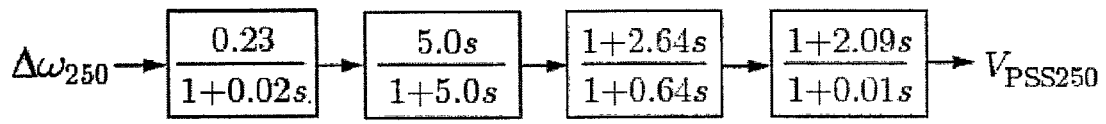
FIG. 10 is a block diagram showing the parameters of a PSS250 after being designed

An example of PSS parameter adjustment by means of numerical value calculation will be described. FIG. 8 is a block diagram showing each of the PSS1 and PSS250 before being adjusted. As a result of the parameter adjustment according to the present invention, the parameters of the PSS1 and PSS250 are designed as shown in FIGS. 9 and 10, respectively.

Figure 11:
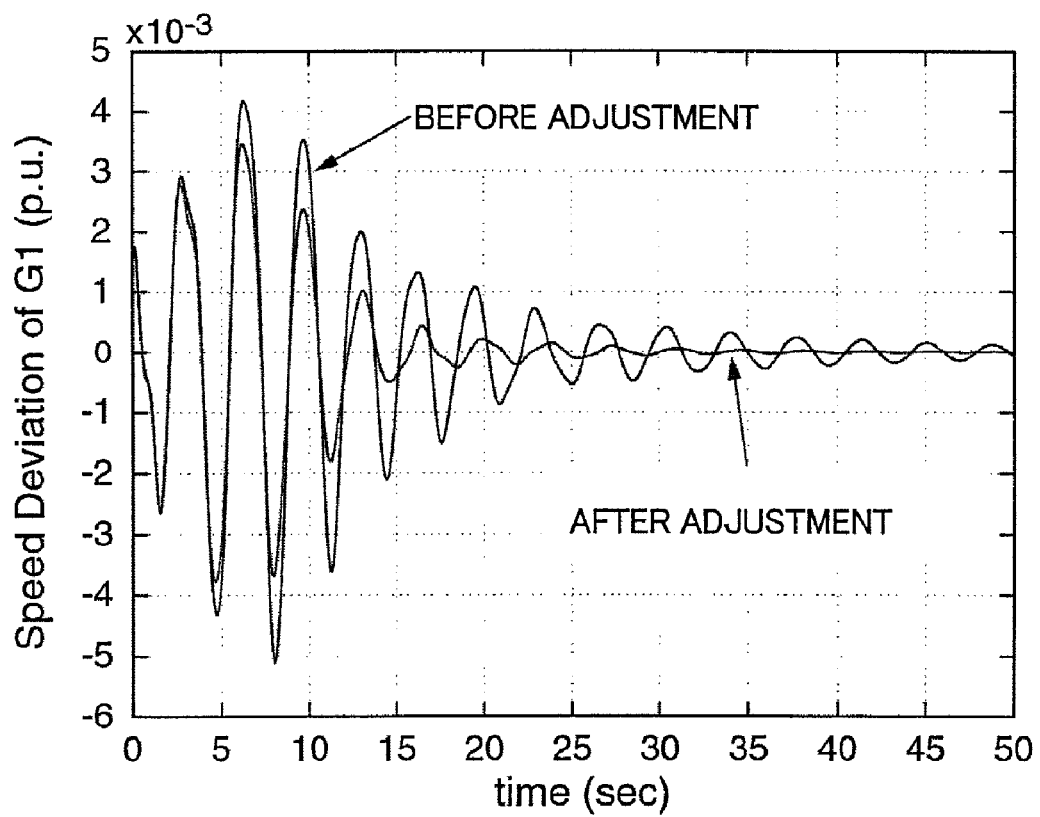
FIG. 11 shows the result of verification through simulation.

FIG. 11 shows the result of comparison performed on the response waveform (rotational angular speed deviation) at the time of occurrence of a system failure. As shown by the waveforms in FIG. 11, a fluctuation can be suppressed quickly, and an instable mode can be stabilized effectively, by means of calculation for PSS parameter adjustment on the basis of the expanded combined vibration model and setting the PSS parameters of the actual system to the adjusted values.

As described above, according to the present invention, control parameters can be calculated theoretically within a short period, not through trial and error, by use of an expanded combined vibration model, whereby real-time control becomes possible. In addition, since the parameter adjustment is performed on the basis of the actually measured values, accurate state grasping and high control effect are expected. Moreover, before implementation of the obtained PSS parameters, the effect of stabilization can be verified within a short time by performing eigenvalue calculation on the basis of a numerical model.

EXAMPLE 3

Figure 12:
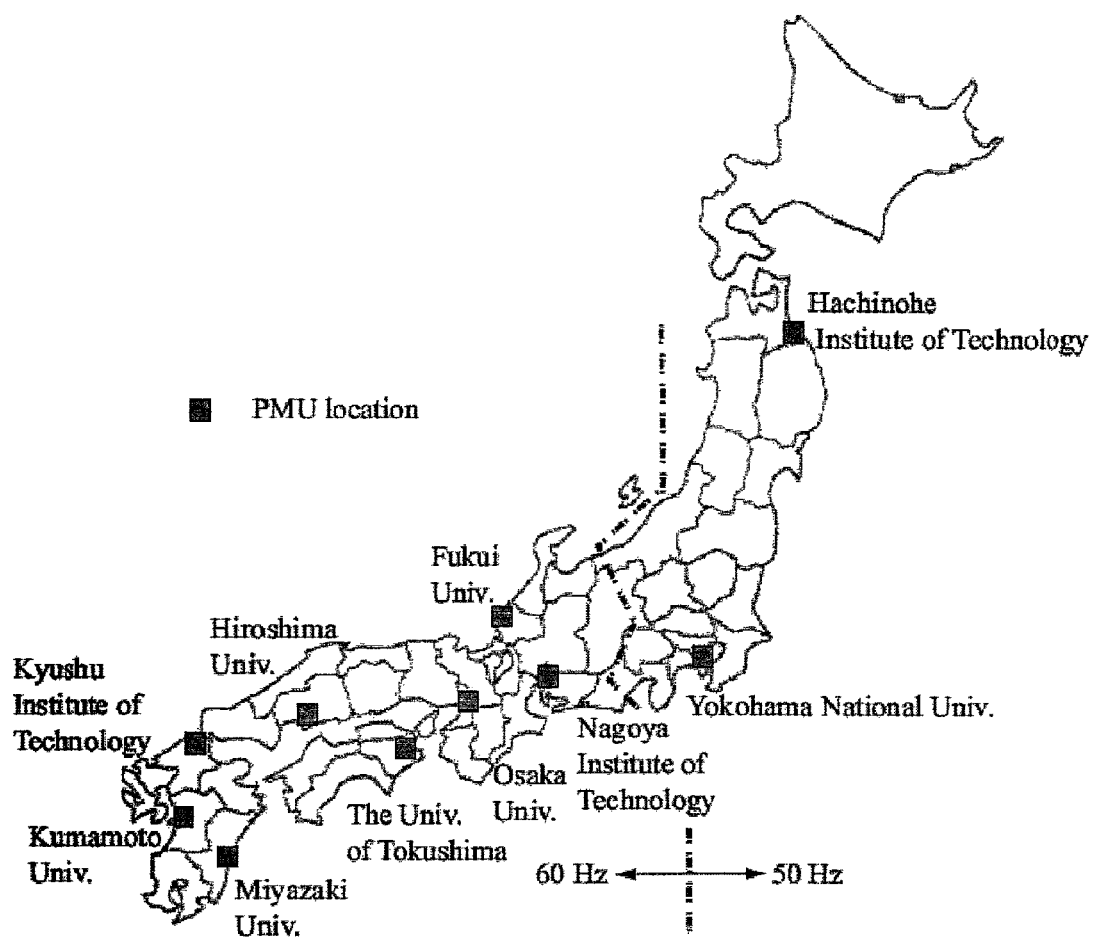
FIG. 12 is a chart showing PMU locations.

The above-described phase measurement apparatus which has a time synchronization function realized by use of the GPS (Global Positioning System) (NCT2000 Type-A (product of Toshiba Corporation)) was installed at universities in various parts of Japan. FIG. 12 shows the locations of the installed phase measurement apparatus (Phasor Measurement Unit; PMU). The PMU is installed at eight locations in the western Japan 60 Hz system, and at two locations in the eastern Japan 50 Hz system. The data are sampled every hour at intervals of 2 per 60 seconds, from 50 min past the hour to 10 min past the hour and from 20 min past the hour to 40 min past the hour so as to continuously obtain phase data from the various parts of Japan. The time periods from 10 min to 20 min past the hour and from 40 min to 50 min past the hour are used to collect to servers the data stored in the individual measurement units. The data obtained at the various locations are continuously transmitted to the data servers at Kyushu Institute of Technology and Nagoya Institute of Technology via the Internet.
(Power Fluctuation Characteristic of the Western Japan 60 Hz System at the Time of Occurrence of a System Disturbance)

Figure 13:
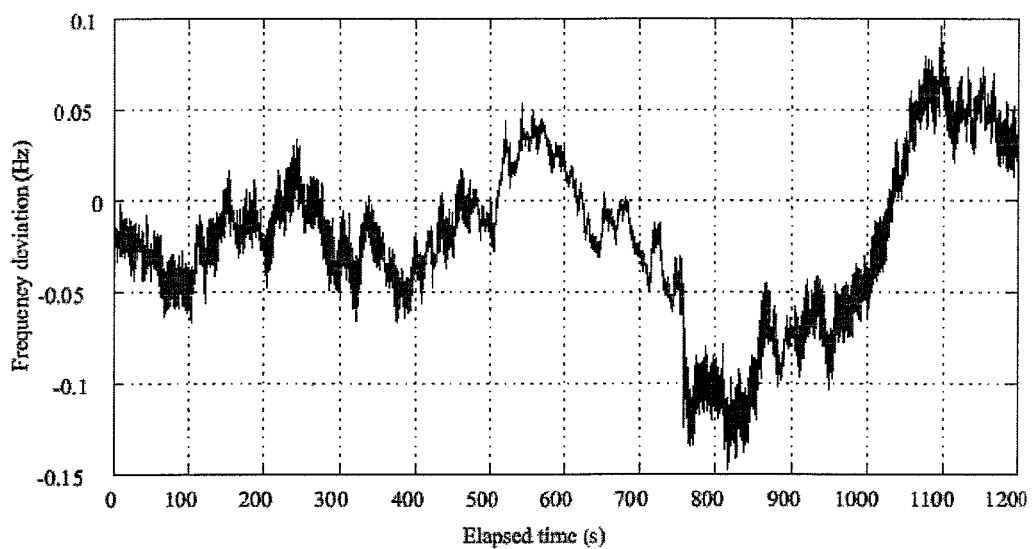
FIG. 13 is a chart showing frequency change at Kyushu Institute of Technology.

FIG. 13 shows frequency changes measured at the Kyushu Institute of Technology from 18:50 to 19:10 on Aug. 24, 2003. At around 19:02 on that day, a generator (operated at 347,000 kW) at a thermal power plant located at Kanda in the suburbs of Kitakyushu-City, Fukuoka experienced an emergency stop due to an equipment failure (according to the press release on the home page of KYUSHU ELECTRIC POWER CO., INC.). Since this stoppage is not a scheduled stoppage such as stoppage for regular checkout of the generator, but an unexpected event, it can be seen that the system frequency drops sharply at a time point of about 758 sec.

First, in order to investigate a general frequency change, frequency decomposition was performed for the frequency change data at various regions by means of discrete wavelet transform using a Symlet-type mother wavelet function. In the wavelet transform, an original (mother) wavelet is applied to a single signal while the original wavelet is shifted and scaled, whereby the signal having an arbitrary waveform can be expressed while being divided into local characteristics (Non-Patent Document 8).

Figure 14:
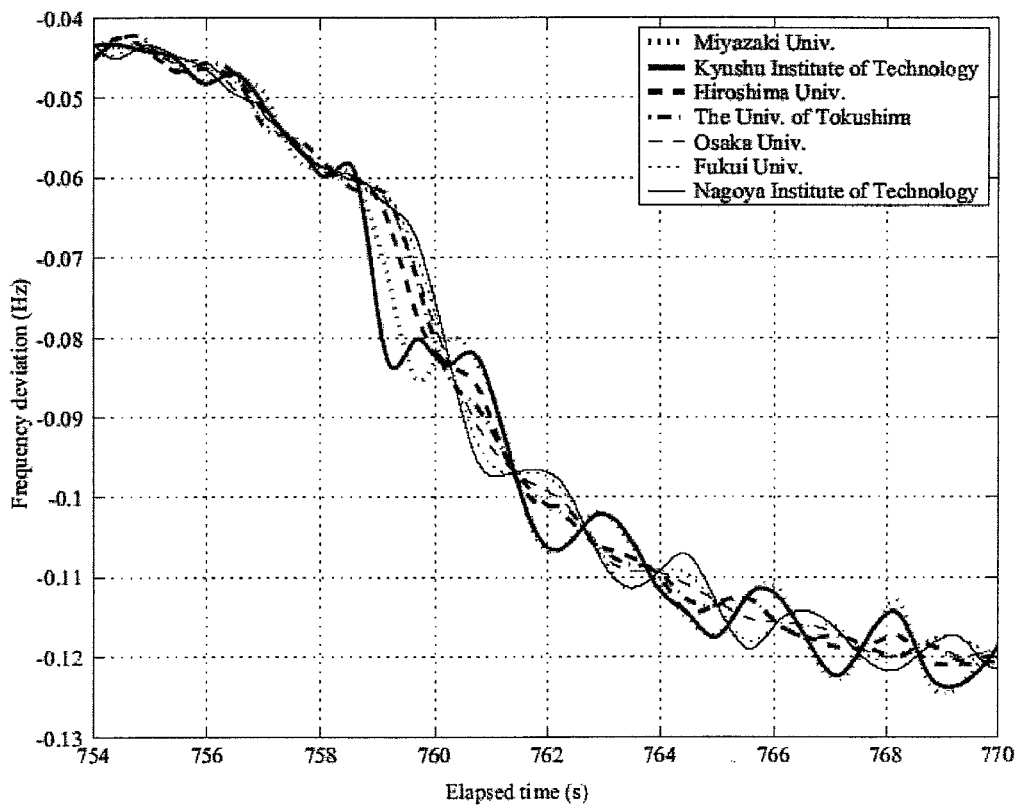
FIG. 14 is a chart showing frequency changes at various locations.
Figure 15:
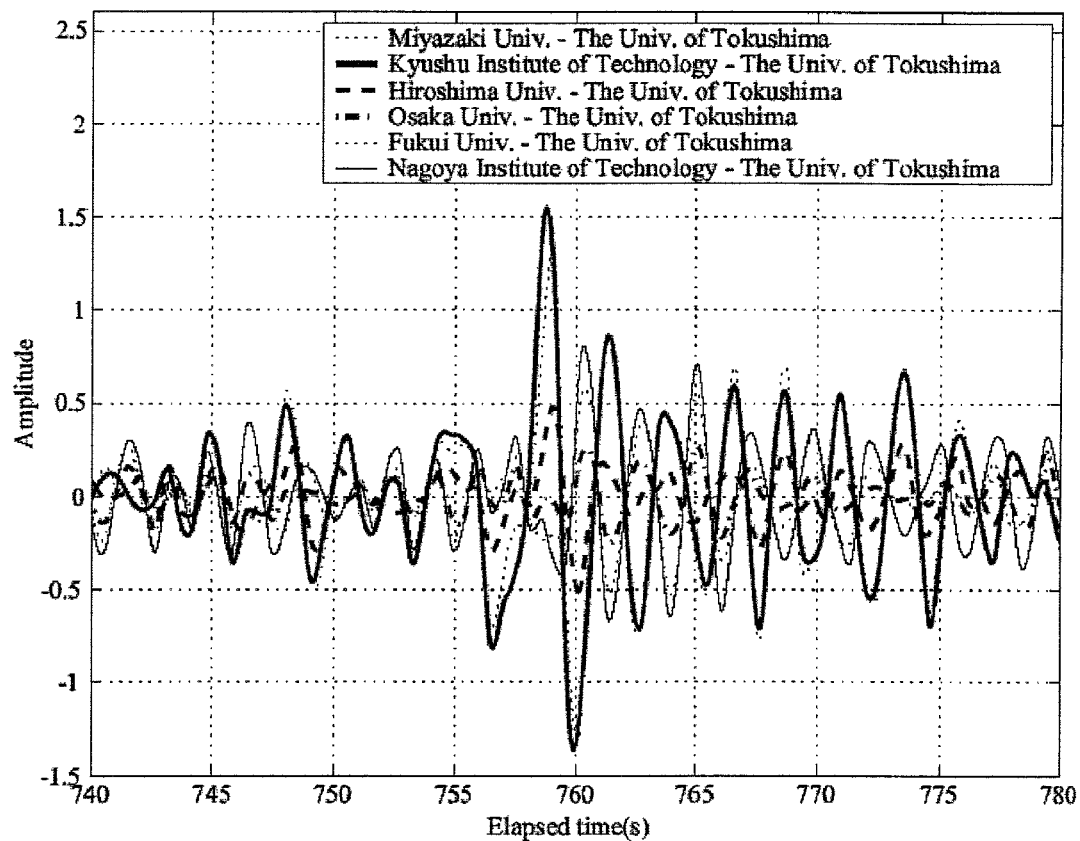
FIG. 15 is a chart showing power fluctuations at various locations.

FIG. 14 shows extracted frequency components of 0.8 Hz or lower for comparison. As can be seen from this chart, an influence of a frequency drop stemming from the stoppage of the generator first appears at Kyushu Institute of Technology after passage of a time point of about 758 sec. and after that the frequencies at various locations change greatly, and a power fluctuation occurs. In order to extract this power fluctuation, phase differences were measured at various universities with the phase at the University of Tokushima used as a reference. Fluctuation components of 0.2 to 0.8 Hz were extracted from the thus-obtained phase difference data by means of discrete wavelet transform. FIG. 15 shows the extracted fluctuation components for comparison. As can be seen from this chart, a remarkable power fluctuation mode appeared after generation of the system disturbance.

Figure 16A:
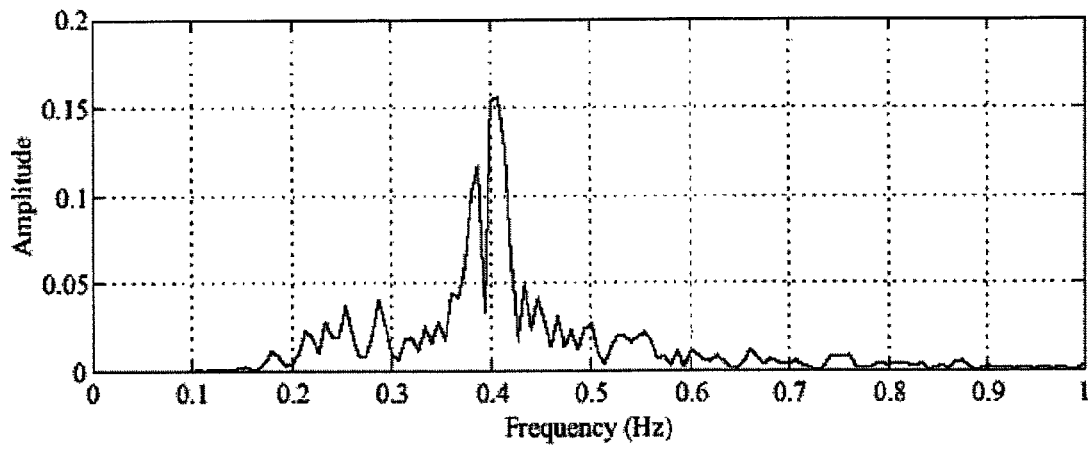
FIG. 16 is a pair of charts each showing the result of FFT analysis on power fluctuation waveform.
Figure 16B:
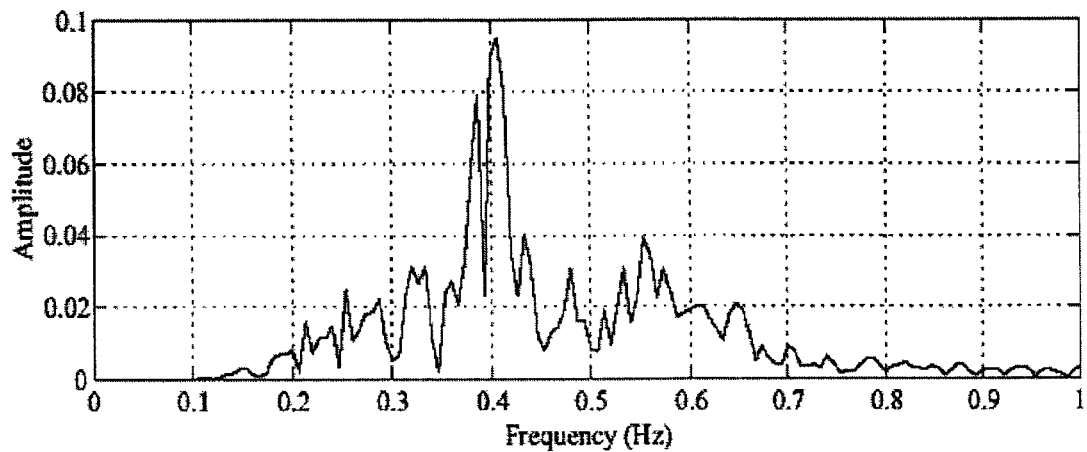

In order to investigate the characteristic feature of this fluctuation component, FFT analysis was performed on data of phase differences (0.2 to 0.8 Hz) between Miyazaki University and Nagoya Institute of Technology and between Miyazaki University and The University of Tokushima, respectively, during a 150 sec period after time point 758 sec immediately after the accident. FIG. 16 shows the results of investigation on the frequency components. As can be seen from FIG. 16(A), a remarkable fluctuation component of about 0.4 Hz appears in the data of the phase difference between the two universities located at the opposite ends of the system. Further, as can be seen from FIG. 16(B), in addition to the fluctuation component of about 0.4 Hz, a fluctuation component in a frequency domain of 0.5 Hz or higher appears in the data of the phase difference between the two universities located at one end and the center of the system, respectively.

In order to separate the fluctuation components of the phase differences of 0.2 to 0.8 Hz between Miyazaki University and The University of Tokushima and between Nagoya Institute of Technology and The University of Tokushima into a component lower than 0.5 Hz and a component higher than 0.5 Hz, phase difference data for a 20 minute period were divided into data of small sections (200 sec intervals), and a filtering process making use of FFT was attempted under the assumption that the state in each small section is steady. In the filtering process making use of FFT, among components obtained through FFT processing, only a component corresponding to a frequency of interest is taken out, reverse FFT processing is performed with data of zero set for unnecessary frequency domains, and only the real part is taken out, whereby a time response waveform from which unnecessary frequency components were completely removed can be obtained.

Figure 17:
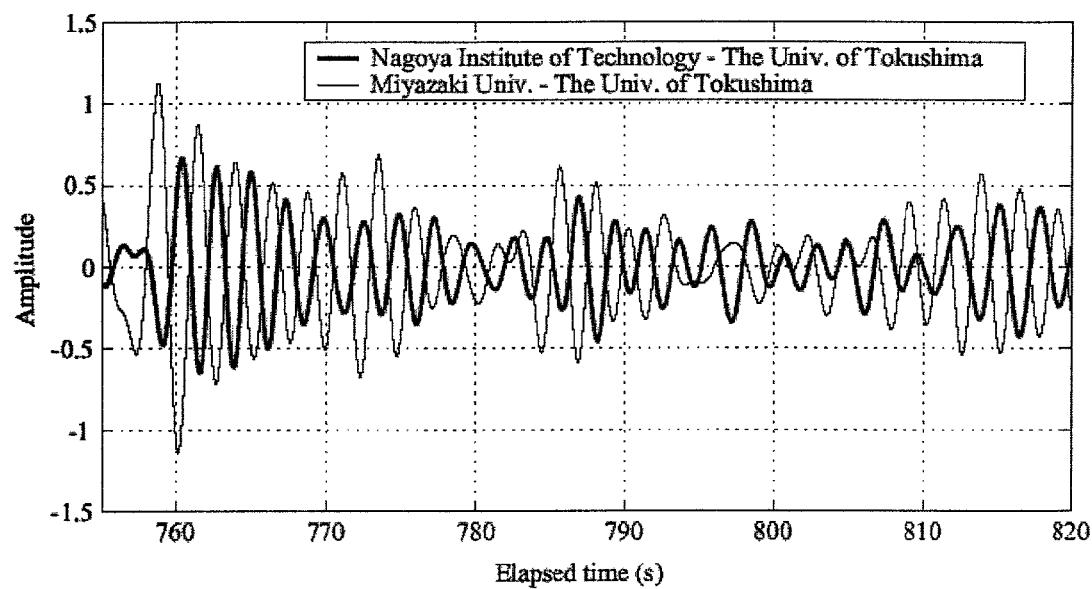
FIG. 17 is a chart showing the fluctuation waveform of a first mode.
Figure 18:
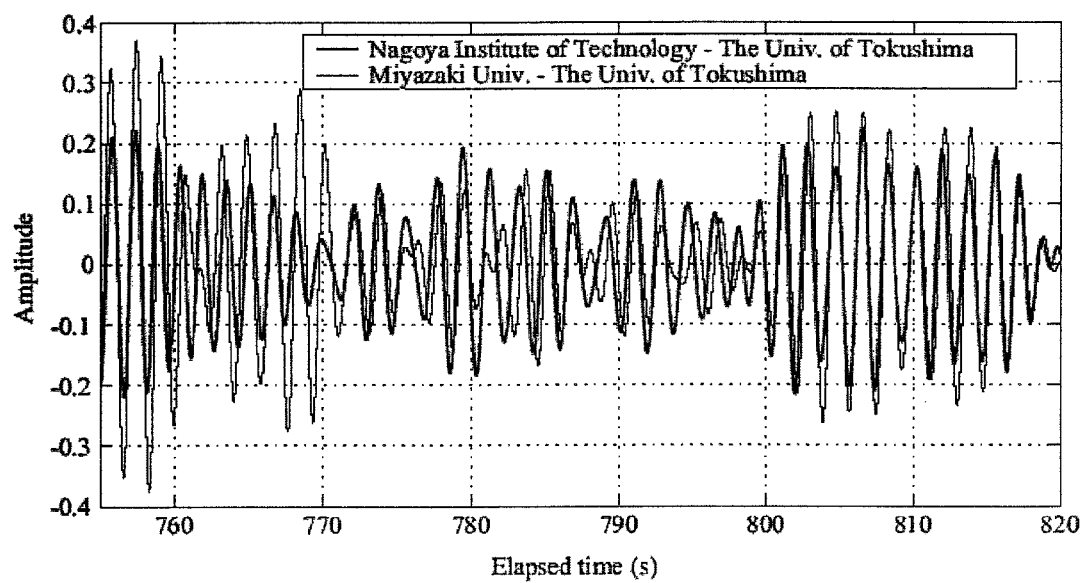
FIG. 18 is a chart showing the fluctuation waveform of a second mode.

When unnecessary frequency components are removed by the above-described method, the phase information in the frequency bands not removed is preserved intact (Non-Patent Document 9). Fluctuation components of 0.2 to 0.5 Hz were extracted from the data of the phase differences between Nagoya Institute of Technology and The University of Tokushima and between Miyazaki University and The University of Tokushima. FIG. 17 shows the extracted fluctuation components for comparison. FIG. 18 shows, for comparison, the fluctuation components of 0.5 to 0.8 Hz extracted from the phase difference data. The fluctuation components of FIG. 17 show that fluctuations of opposite phases occur at the opposite ends of the system. In the mode analysis for a longitudinal system, of the elements of the characteristic vector in each mode, the elements corresponding to the angular speed deviations or phase angles of the generators are each a phase of 0° or 180°. Therefore, the fluctuation mode corresponds to vibration of a chord whose opposite ends are free. In particular, the fluctuation mode having the longest period is a mode in which fluctuations of opposite phases occur at the opposite ends of the system (Non-Patent Document 10). From the above, it is found that the fluctuation component shown in FIG. 17 is the first mode (long-period fluctuation) which appears over the entire system. Further, as can been seen from FIG. 18, the fluctuation waveform in the range of 0.5 to 0.8 Hz shows the tendency that fluctuations of the same phase occur at the opposite ends of the system.

The fluctuation in the range of 0.5 to 0.8 Hz is higher in frequency than the long-period fluctuation having the lowest frequency in the longitudinal system, and the voltage fluctuates in the same direction at the opposite ends of the system with respect to the center of the system. Therefore, the fluctuation in the range of 0.5 to 0.8 Hz is considered to be the second mode in which the fluctuations occurring at the opposite ends of the system are opposite in phase to the fluctuation occurring at the center of the system (Non-Patent Document 10).

Figure 19:
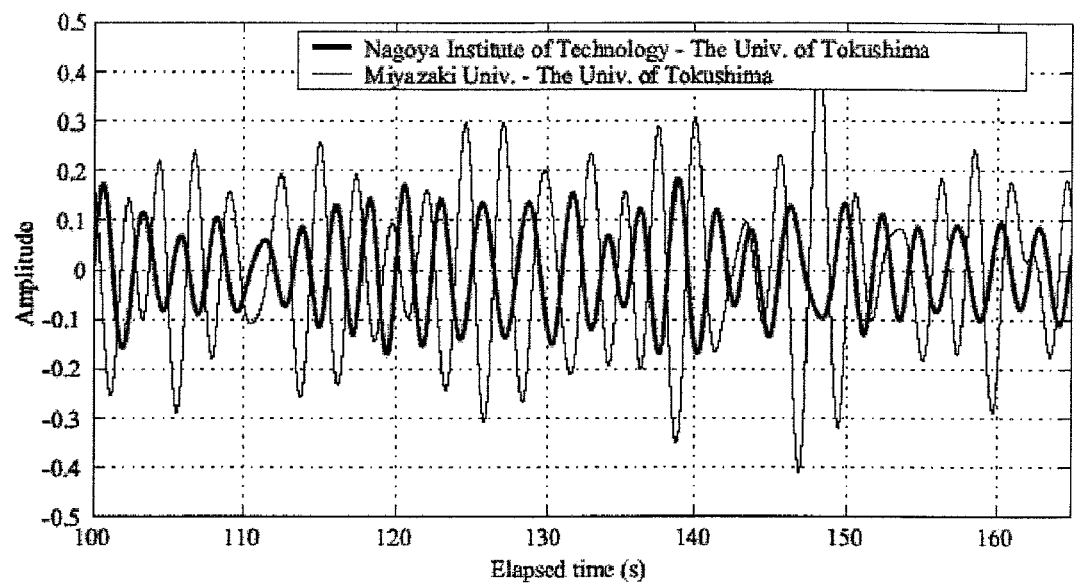
FIG. 19 is a chart showing the fluctuation waveform of a first mode.
Figure 20:
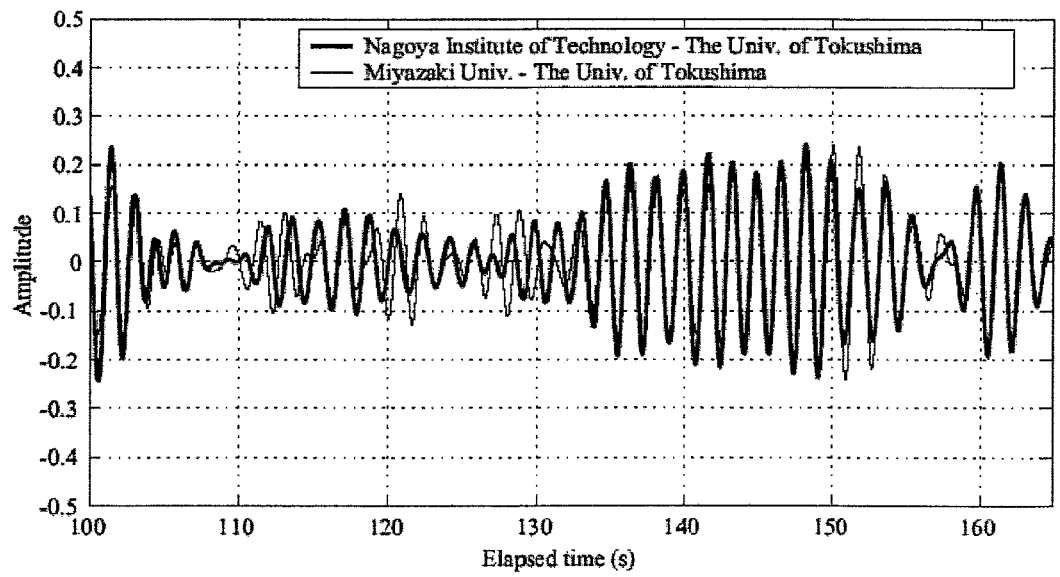
FIG. 20 is a chart showing the fluctuation waveform of a second mode.

Fluctuation components of 0.2 to 0.5 Hz were extracted from the data of the phase differences between Nagoya Institute of Technology and The University of Tokushima and between Miyazaki University and The University of Tokushima from 19:50 to 20:10 on Aug. 24, 2003, which is about one hour after the stoppage of the generator. FIG. 19 shows the extracted fluctuation components for comparison. FIG. 20 shows the fluctuation components of 0.5 to 0.8 Hz extracted from the phase difference data. From these charts, it is found that in the frequency domain of 0.2 to 0.8 Hz, the two fluctuation modes are dominant even when the load changes to a very small extent; e.g., in a steady state.

(Structure of a Combined Vibration Model Based on Wide-Area Phase Measurement)

As described above, in an electric power system having a longitudinal configuration, which is represented by the western Japan 60 Hz system, two modes; i.e., a mode to which the generators at the opposite ends of the system relate and a mode to which the generators at the center and opposite ends of the system relate, are dominant, and it is known that mutual action is likely to occur between these modes. In view of this, with one end of the system used as a phase angle reference, phase differences at the other end and center of the system are observed. The thus-obtained fluctuation is subjected to discrete wavelet transform to thereby extract an inter-system fluctuation component. Further, for data sets obtained through first-order and second-order differentiations of the component, the following expanded combined vibration model is constructed by use of a least squares method. In the following equation, x1 to x4 with dots represents differential values of x1 to x4, respectively.

[Formula 7]

$$\begin{bmatrix} \dot{x}_1 \\ \dot{x}_2 \\ \dot{x}_3 \\ \dot{x}_4 \end{bmatrix} = \begin{bmatrix} a_1 & a_2 & a_3 & a_4 \\ 1 & 0 & 0 & 0 \\ b_1 & b_2 & b_3 & b_4 \\ 0 & 0 & 1 & 0 \end{bmatrix} \begin{bmatrix} x_1 \\ x_2 \\ x_3 \\ x_4 \end{bmatrix} \quad (3)$$

where $x_1 = \dot{\delta}_1 - \dot{\delta}_s$ $x_2 = \delta_1 - \delta_s - (\delta_{1e} - \delta_{se})$ $x_3 = \dot{\delta}_2 - \dot{\delta}_s$ $x_4 = \delta_2 - \delta_s - (\delta_{2e} - \delta_{se})$ [Formula 8]

δ with subscript 1 or 2 represents the phase at the corresponding point of interest, δ with subscript s represents the phase at the reference point, and δ with subscript e represents the initial value of the phase. The attenuations and frequencies of the two dominant modes can be obtained by obtaining the eigenvalues of the coefficient matrix.

Here, the model of Eq. (3) is expanded. That is, an expanded model having the following configuration is created such that the expanded model includes the effects of PSSs which are installed for the two generators of interest and whose model is known.

[Formula 9]

$$\begin{bmatrix} \dot{x}_1 \\ \dot{x}_2 \\ \dot{x}_3 \\ \dot{x}_4 \\ \dot{x}_{PSS1} \\ \dot{x}_{PSS2} \end{bmatrix} = \begin{bmatrix} a'_1 & a'_2 & a'_3 & a'_4 & c_1^T \\ 1 & 0 & 0 & 0 & \\ b'_1 & b'_2 & b'_3 & b'_4 & c_2^T \\ 0 & 0 & 1 & 0 & \\ & & D_1 & & \\ & & D_2 & & \end{bmatrix} \begin{bmatrix} x_1 \\ x_2 \\ x_3 \\ x_4 \\ x_{PSS1} \\ x_{PSS2} \end{bmatrix} \quad (4)$$

In Eq. (4), $x_{PSS1}$ and $x_{PSS2}$ are vectors composed of state variables of the respective PSSs. c1 and c2 are coefficient vectors, which are determined along with $a'_i$ and $b'_i$ by means of a least-squares method, and in which only one component in relation to the output of the corresponding PSS is non-zero, and the remaining components are all zero. The matrices $D_1$ and $D_2$ are each determined by the structure of the corresponding PSS and include parameters such as the gain and time constant of the PSS. Notably, the PSSs are assumed to be of a Δω type for suppressing inter-system fluctuations, and x1 and x3 are used as inputs of the PSSs in the model. For example, the fluctuation component of 0.2 to 0.8 Hz extracted from the data of the phase difference between Nagoya Institute of Technology and Miyazaki University through discrete wavelet transform can be used as x1, and the phase difference (0.2 to 0.8 Hz) between The University of Tokushima and Miyazaki University can be used as x3. The time-series data regarding the state variables of the PSSs at the time of constitution of the model can be obtained by use of these data as inputs. Thus, the matrix of Eq. 4 is determined. The dominant modes can be stabilized by directly adjusting and determining the PSS parameters by means of the expanded combined vibration model.

Notably, the example in which the instability modes include the first and second modes has been described. However, when the number of the instability modes is greater than two, the model is expanded to prepare a multi-order model having the same configuration. Use of such a multi-order model enables the same logical development through expansion of Eqs. (3) and (4).

(Example Analysis for WEST 10-generator System)

Figure 21:
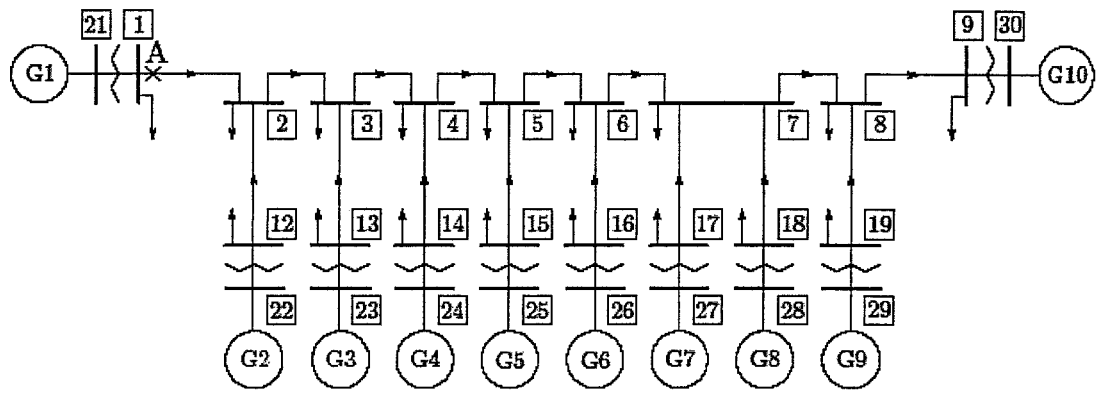
FIG. 21 is a diagram showing a WEST 10-generator system, which is a standard model employed by the Institute of Electrical Engineers of Japan.
Figure 22:
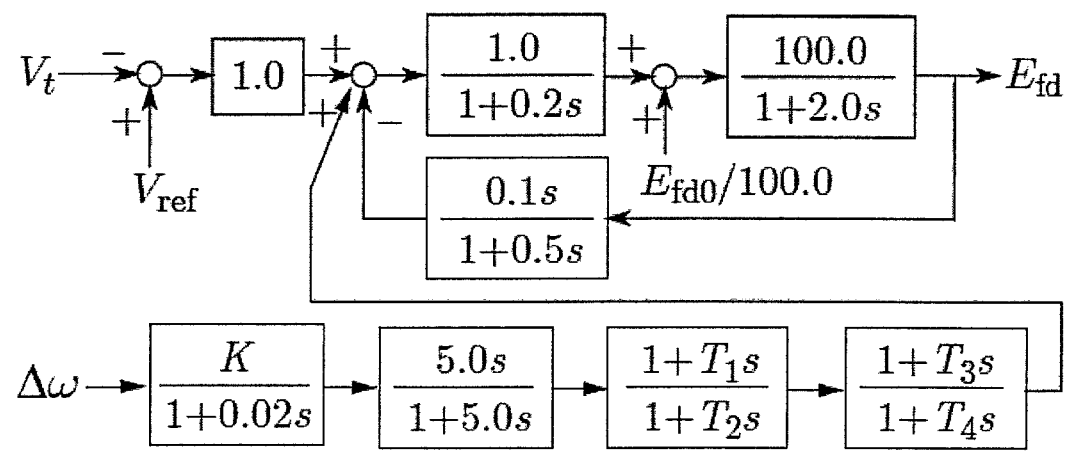
FIG. 22 is a block diagram exemplifying a generator controller.

Here, an attempt is made to apply the present method to the WEST 10-generator system (Non-Patent Document 4) shown in FIG. 21, which is a standard model employed by the Institute of Electrical Engineers of Japan. The constants shown in Non-Patent Document 4 were used as system constants. An excitation apparatus (AVR) shown in FIG. 22 is taken into consideration as a generator controller. A Δω-type PSS is installed for the generators 1 and 5. K represents the gain, and T1 to T4 represent the time constants of the phase compensators. These constants are adjusted. Notably, the limiter and governor of the AVR and PSS are not taken into consideration. Here, the load characteristic of the system is assumed to be of constant current, and there is assumed a state in which, at an intermediate cross section, the output of the generator 1 and the load of the bus line 2 each increase by 1600 MW, and large current flows between the bus lines 1 and 2. Here, analysis was performed by use of EUROSTAG, which is a general power system simulation software program.

FIG. 23 shows changes in eigenvalues for the case where the parameters of the PSS installed for the generator 1 were changed. FIG. 23 shows, for comparison, the eigenvalues of the dominant modes obtained through linearization of the entire system and the eigenvalues obtained through construction of the model of Eq. (4). Notably, the values shown in FIG. 24 were used as the initial setting values of the PSS. The difference between the eigenvalue sets is small, which indicates that the eigenvalues are obtained accurately. Further, since a high degree of coincidence is observed in the tendency of changes in the eigenvalues with parameter changes, the estimation of the eigenvalues through constitution of a model can be performed with high accuracy. Notably, in the constitution of a model, a very small fluctuation generated by slightly changing the load in simulation is used, which simulates a fluctuation observed in the system in a steady state.

FIG. 24 shows the results of adjustment of the PSS performed on the basis of the model of Eq. (4). In this case, three-phase grounding occurred at point A in FIG. 21, and the original system state was restored after elapse of 0.01 sec. The rotational angular speed deviations of the generator 1 at this time are shown in FIG. 11, which shows that the fluctuation was suppressed through adjustment of the PSS.

As described above, a combined vibration model including the effect of PSSs is constructed from the observed fluctuation as a control method for fluctuation stabilization based on wide-area phase measurement. The accuracy of the eigenvalue estimation through constitution of the model and the effect of suppressing a long-period fluctuation through PSS parameter adjustment were confirmed.

The invention claimed is:

1. A method for controlling the stability of an electric power system in real time on the basis of data collected at a plurality of points over a wide area, the method comprising the steps of:
    detecting, at each of the plurality of points in the wide area, the phase of voltage at a power supply outlet used by a consumer;
    transmitting data including the phase information and time information to a data server via a network;
    causing a data server to observe, with one end of the system used as a phase angle reference, phase differences at the other end and at the center of the system;
    extracting an inter-system fluctuation component from an obtained fluctuation, and constructing an expanded combined vibration model for data sets obtained through first-order and second-order differentiations of the component, the expanded combined vibration model being obtained by expanding a combined vibration model which represents a first mode in which fluctuations of opposite phases occur at the opposite ends of the system and a second mode in which fluctuations occur at the opposite ends of the system in phase opposite to that of a fluctuation occurring at the center of the system by use of the obtained phase difference information, the expansion being performed to include a known model of a PSS (Power System Stabilizer) provided for a generator of interest; and
    obtaining time-series data regarding the state variables of the PSS at the time of construction of the expanded combined vibration model, and determining PSS parameters directly therefrom by use of the expanded combined vibration model, whereby stabilization of the dominant modes is achieved.

2. A method for controlling the stability of an electric power system according to claim 1, wherein the inter-system fluctuation component is extracted from the obtained fluctuation through wavelet transform.

3. A method for controlling the stability of an electric power system according to claim 1, wherein the extended combined vibration model is represented by the following equation:

$$\begin{bmatrix} \dot{x}_1 \\ \dot{x}_2 \\ \dot{x}_3 \\ \dot{x}_4 \\ \dot{x}_{PSS1} \\ \dot{x}_{PSS2} \end{bmatrix} = \begin{bmatrix} a'_1 & a'_2 & a'_3 & a'_4 & c_1^T \\ 1 & 0 & 0 & 0 & 0 \\ b'_1 & b'_2 & b'_3 & b'_4 & c_2^T \\ 0 & 0 & 1 & 0 & 0 \\ & & D_1 & & \\ & & D_2 & & \end{bmatrix} \begin{bmatrix} x_1 \\ x_2 \\ x_3 \\ x_4 \\ x_{PSS1} \\ x_{PSS2} \end{bmatrix} \quad \text{[Formula 2]}$$

where
    x1 to x4 are defined as follows:

$$x_1 = \dot{\delta}_1 - \dot{\delta}_s$$

$$x_2 = \delta_1 - \delta_s - (\delta_{1e} - \delta_{se})$$

$$x_3 = \dot{\delta}_2 - \dot{\delta}_s)$$

$$x_4 = \delta_2 - \delta_s - (\delta_{2e} - \delta_{se}) \quad \text{[Formula 1]}$$

(δ with subscript 1 or 2 represents the phase at the corresponding point of interest, δ with subscript s represents the phase at the reference point, and δ with subscript e represents the initial value of the phase);
    $x_{PSS1}$ and $x_{PSS2}$ are vectors composed of state variables of the respective PSS's;
    c1 and c2 are coefficient vectors, which are determined along with a'i and b'i by means of a least-squares method; and
    the matrices D1 and D2 are each determined by the structure of the corresponding PSS and include parameters such as the gain and time constant of the PSS.

4. A system for controlling the stability of an electric power system in real time on the basis of data collected at a plurality of points over a wide area, the system comprising:

a phase measurement apparatus disposed at each of a plurality of points in the wide area and adapted to detect the phase of voltage at a power supply outlet used by a consumer and transmit data including the phase information and time information; and a data server which continuously obtains and collects the data from the plurality of points via a network, wherein the data server includes means for observing, with one end of the system used as a phase angle reference, phase differences at the other end and at the center of the system, extracting an inter-system fluctuation component from an obtained fluctuation, and constructing an expanded combined vibration model for data sets obtained through first-order and second-order differentiations of the component;

wherein the expanded combined vibration model is obtained by expanding a combined vibration model which represents a first mode in which fluctuations of opposite phases occur at the opposite ends of the system and a second mode in which fluctuations occur at the opposite ends of the system in phase opposite that of a fluctuation occurring at the center of the system by use of the obtained phase difference information, the expansion being performed to include a known model of a PSS provided for a generator of interest; and time-series data regarding the state variables of the PSS at the time of construction of the expanded combined vibration model are obtained, and PSS parameters are determined directly therefrom by use of the expanded combined vibration model, whereby stabilization of the dominant modes is achieved.

5. A system for controlling the stability of an electric power system according to claim 4, wherein the inter-system fluctuation component is extracted from the obtained fluctuation through wavelet transform.

6. A system for controlling the stability of an electric power system according to claim 4, wherein the extended combined vibration model is represented by the following equation:

$$\begin{bmatrix} \dot{x}_1 \\ \dot{x}_2 \\ \dot{x}_3 \\ \dot{x}_4 \\ \dot{x}_{PSS1} \\ \dot{x}_{PSS2} \end{bmatrix} = \begin{bmatrix} a'_1 & a'_2 & a'_3 & a'_4 & c_1^T \\ 1 & 0 & 0 & 0 & 0 \\ b'_1 & b'_2 & b'_3 & b'_4 & c_2^T \\ 0 & 0 & 1 & 0 & 0 \\ & & D_1 & & \\ & & D_2 & & \end{bmatrix} \begin{bmatrix} x_1 \\ x_2 \\ x_3 \\ x_4 \\ x_{PSS1} \\ x_{PSS2} \end{bmatrix}$$

[Formula 4]

where x1 to x4 are defined as follows:

$x_1 = \dot{\delta}_1 - \dot{\delta}_s$ $x_2 = \delta_1 - \delta_s - (\delta_{1e} - \delta_{se})$ $x_3 = \dot{\delta}_2 - \dot{\delta}_s$ $x_4 = \delta_2 - \delta_s - (\delta_{2e} - \delta_{se})$  [Formula 3]

($\delta$ with subscript 1 or 2 represents the phase at the corresponding point of interest, $\delta$ with subscript s represents the phase at the reference point, and $\delta$ with subscript e represents the initial value of the phase);

$x_{PSS1}$ and $x_{PSS2}$ are vectors composed of state variables of the respective PSS's;

c1 and c2 are coefficient vectors, which are determined along with $a'_i$ and $b'_i$ by means of a least-squares method; and the matrices $D_1$ and $D_2$ are each determined by the structure of the corresponding PSS and include parameters such as the gain and time constant of the PSS.

\* \* \* \* \*